Jan. 31, 1956 C. E. LOMAX 2,733,295

TELEPHONE SYSTEM

Filed March 14, 1951 8 Sheets-Sheet 1

INVENTOR.
CLARENCE E. LOMAX

BY [signature]

ATTORNEY

INVENTOR.
CLARENCE E. LOMAX
BY
ATTORNEY

Jan. 31, 1956 C. E. LOMAX 2,733,295

TELEPHONE SYSTEM

Filed March 14, 1951 8 Sheets-Sheet 3

INVENTOR.
CLARENCE E. LOMAX

BY *[signature]*

ATTORNEY

Jan. 31, 1956 C. E. LOMAX 2,733,295

TELEPHONE SYSTEM

Filed March 14, 1951 8 Sheets-Sheet 4

INVENTOR.
CLARENCE E. LOMAX

BY Wm Walter Owen.

ATTORNEY

INVENTOR.
CLARENCE E. LOMAX
BY Mc Watts Owen.
ATTORNEY

INVENTOR.
CLARENCE E. LOMAX
BY [signature]
ATTORNEY

Jan. 31, 1956 C. E. LOMAX 2,733,295

TELEPHONE SYSTEM

Filed March 14, 1951 8 Sheets-Sheet 7

INVENTOR.
CLARENCE E. LOMAX

BY Wm. Walter Owen.

ATTORNEY

INVENTOR.
CLARENCE E. LOMAX
BY
ATTORNEY

United States Patent Office 2,733,295

Patented Jan. 31, 1956

2,733,295

TELEPHONE SYSTEM

Clarence E. Lomax, Chicago, Ill., assignor to Automatic Electric Laboratories, Inc., Chicago, Ill., a corporation of Delaware Application March 14, 1951, Serial No. 215,561

21 Claims. (Cl. 179—6.3)

The present invention relates in general to telephone systems and more particularly to improvements in the switching equipment in an automatic system.

An object of the invention is to provide an improved system wherein all classes of lines, namely, paystation, single party, single party metered, two party metered, P. A. B. X, etc., may be served over the same combined line recording (hereinafter referred to as CLR) trunk circuit.

Another object of the invention is to provide in such an improved system a paystation repeater circuit that will be effective for allowing one digit to be dialled without depositing a coin in order to initiate free service and emergency calls.

Another object of the invention is to provide in such an improved system a paystation repeater circuit that will time a call therethrough and disable the talking circuit at the end of a pre-determined period until an additional coin is deposited.

A further object of the invention is to provide in such an improved system a circuit effective when calling from certain substations for causing an indicating signal to be transmitted to the toll operator in order to inform her that a toll call should not be extended from that particular calling station.

A further object of the invention is to provide in such an improved system a two party metering system in which an extra cam in the dial at one of the party line substations serves to ultimately control the meter selection.

Figures 1, 9:
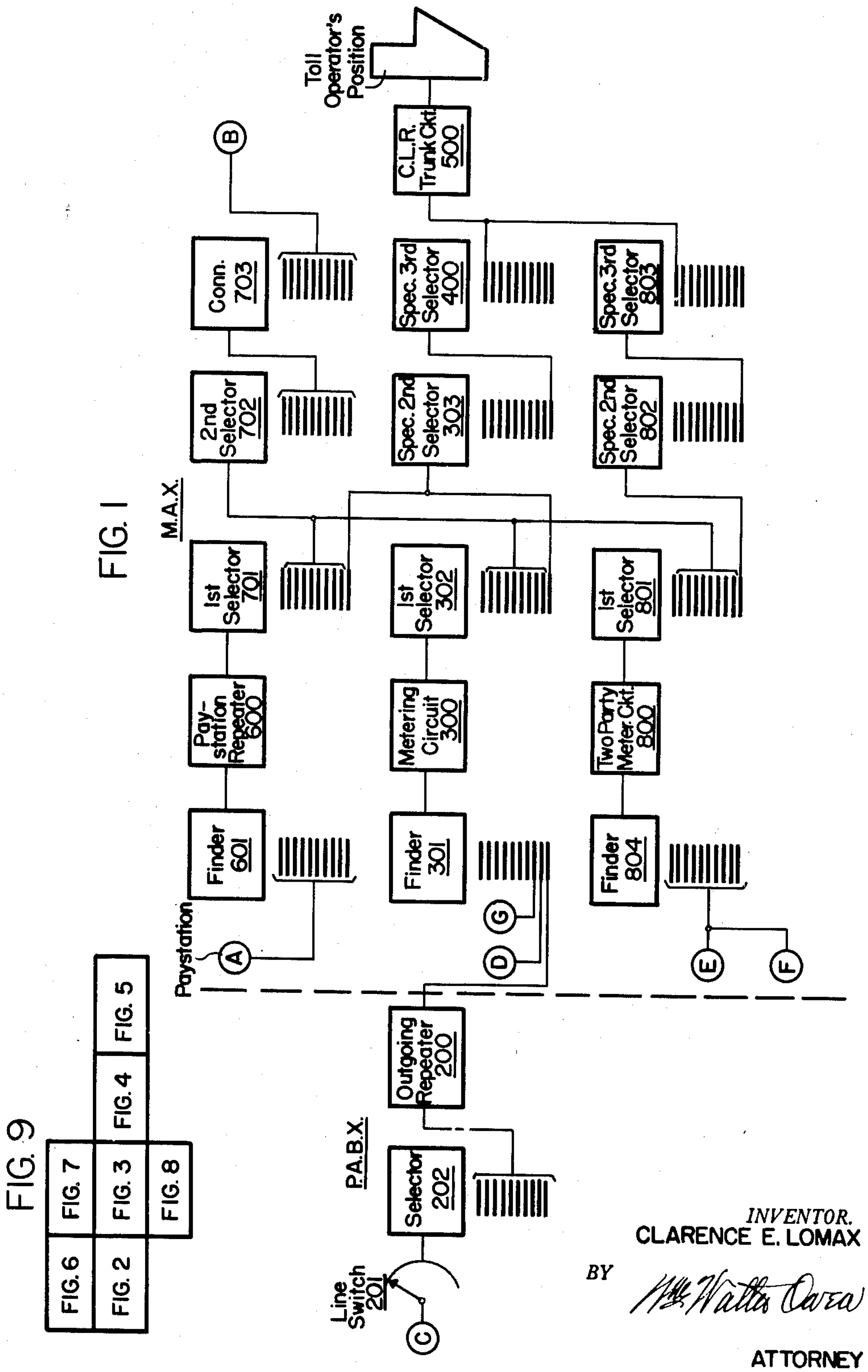
Figure 2:
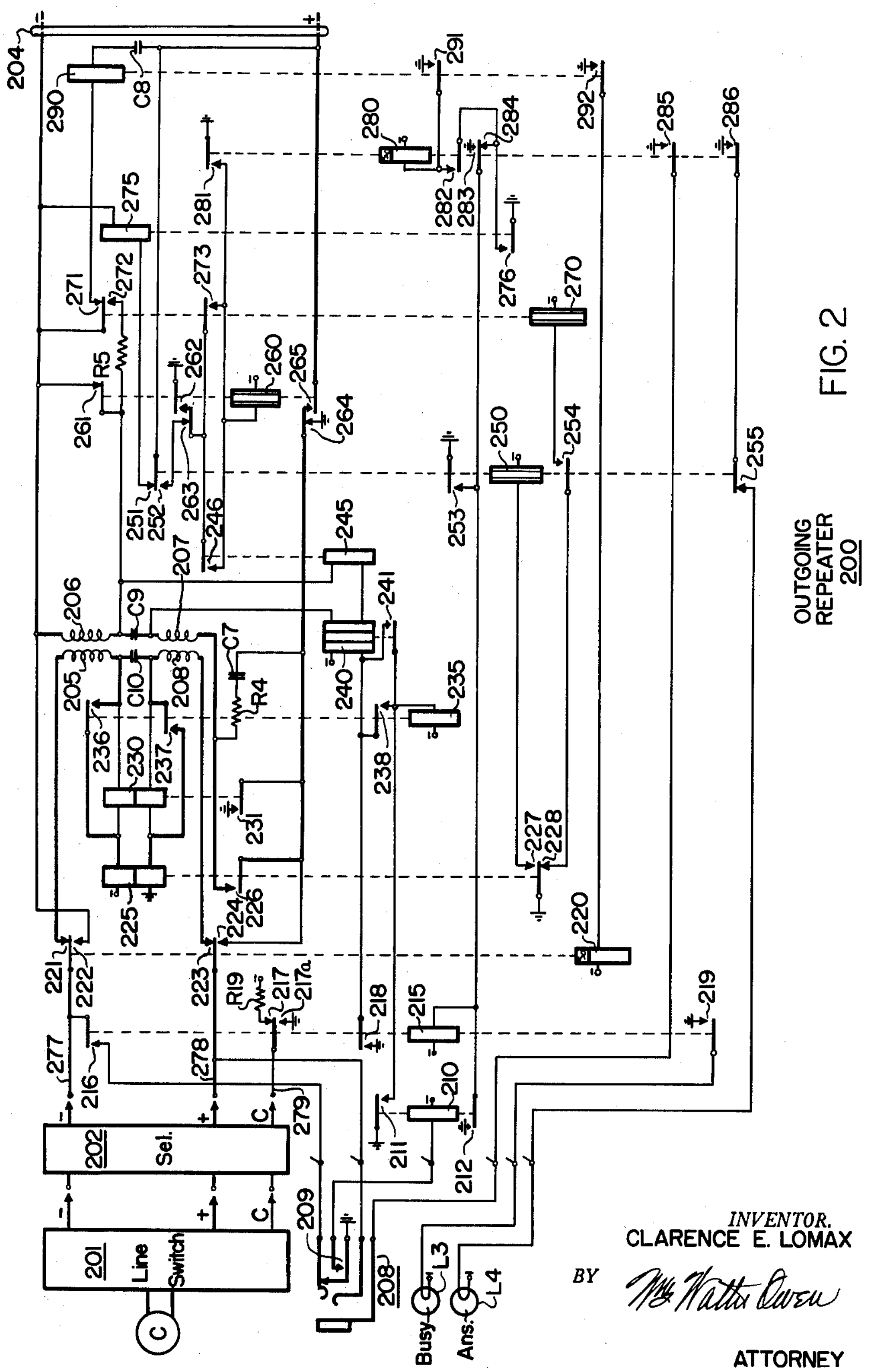

These and other objects are accomplished, according to the invention, by the arrangement and combination of elements set forth in the following description, defined in the appended claims and illustratively exemplified in the accompanying drawings, in which Fig. 1 illustrates the general arrangement and trunking diagram of a telephone system embodying the present invention; Figs. 2 to 8, inclusive, taken together, illustrate the details of the system; and Fig. 9 illustrates the mode of arranging Figs. 2 to 8, inclusive, to form a unified system.

Figure 3:
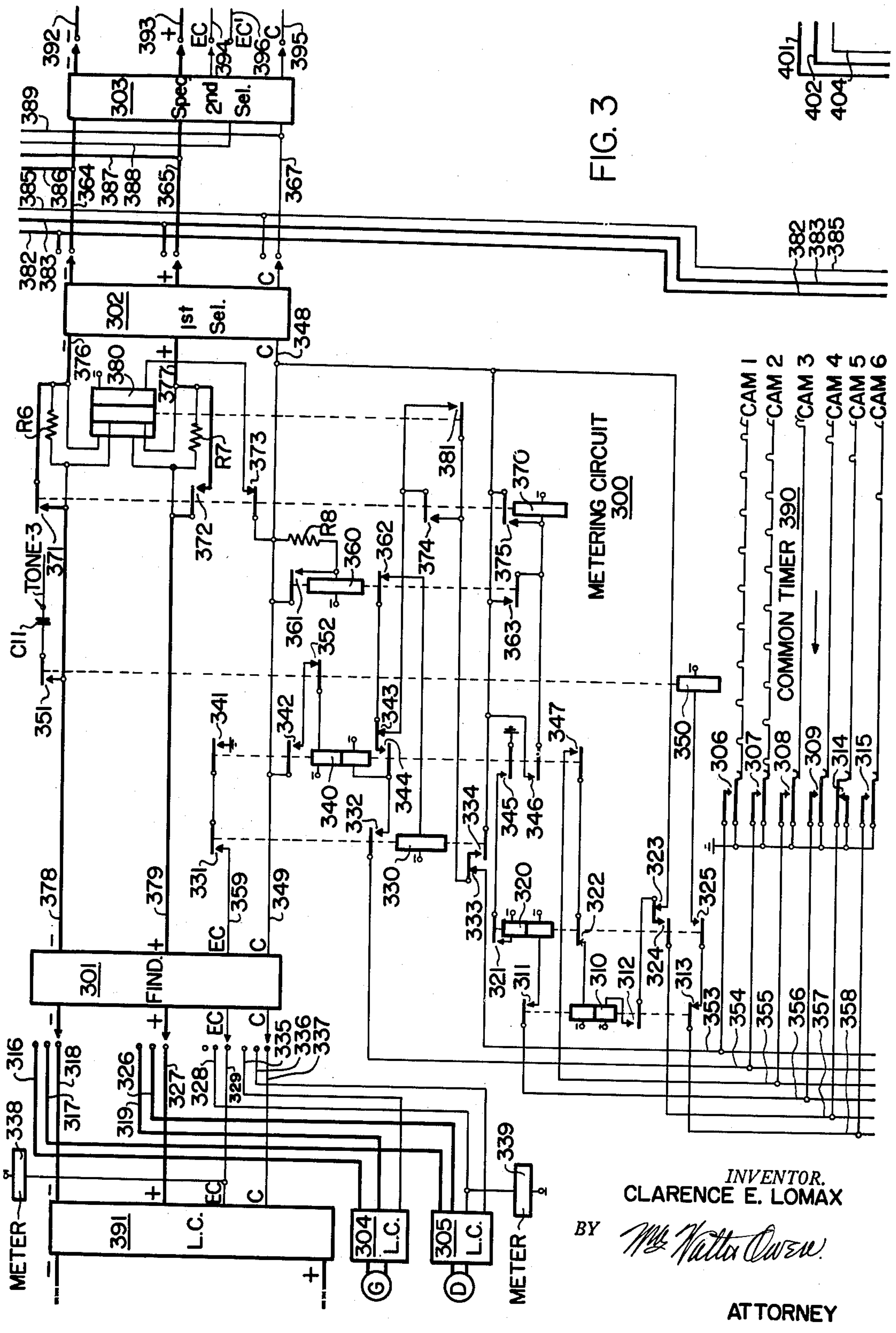
Figure 4:
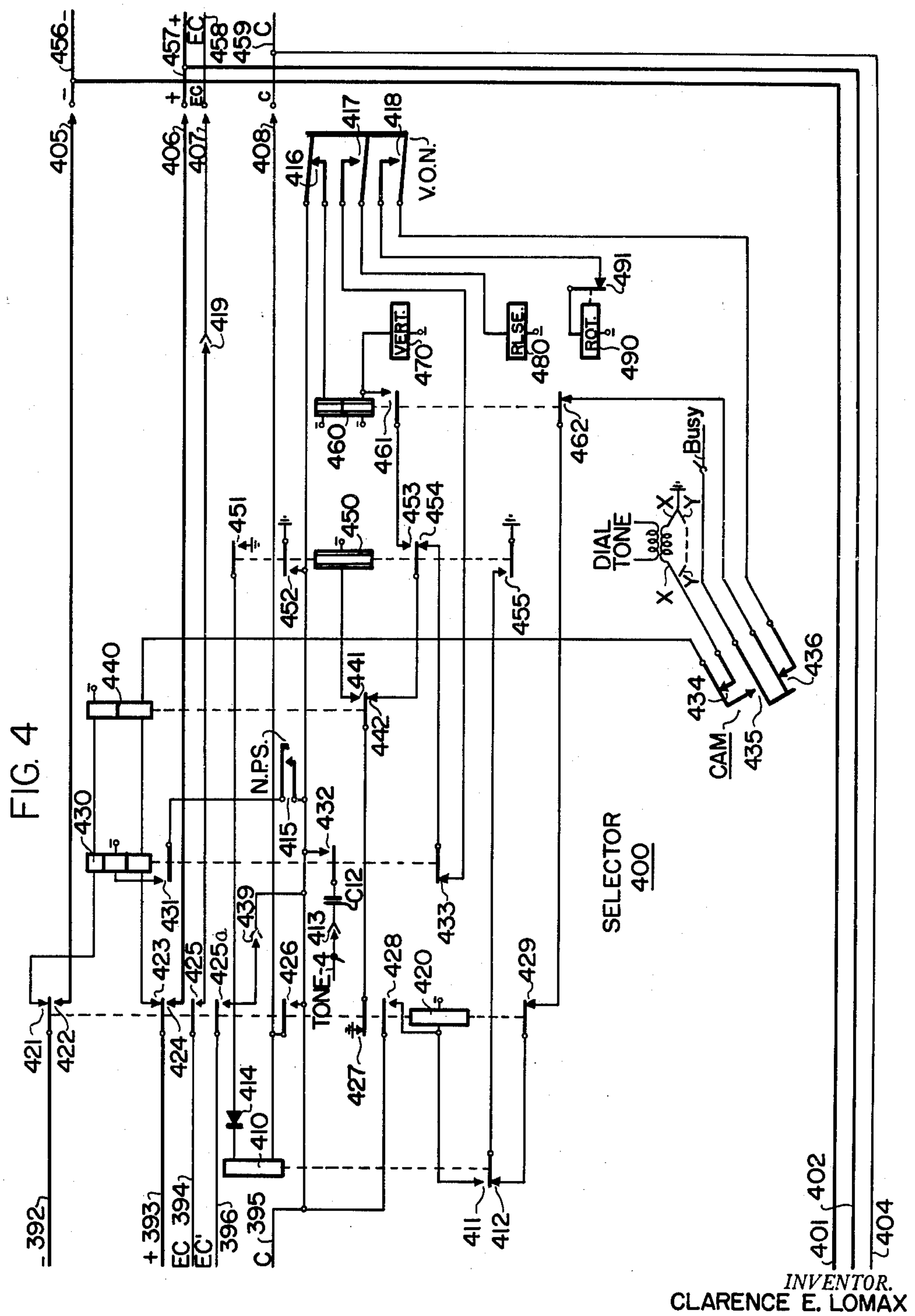
Figure 5:
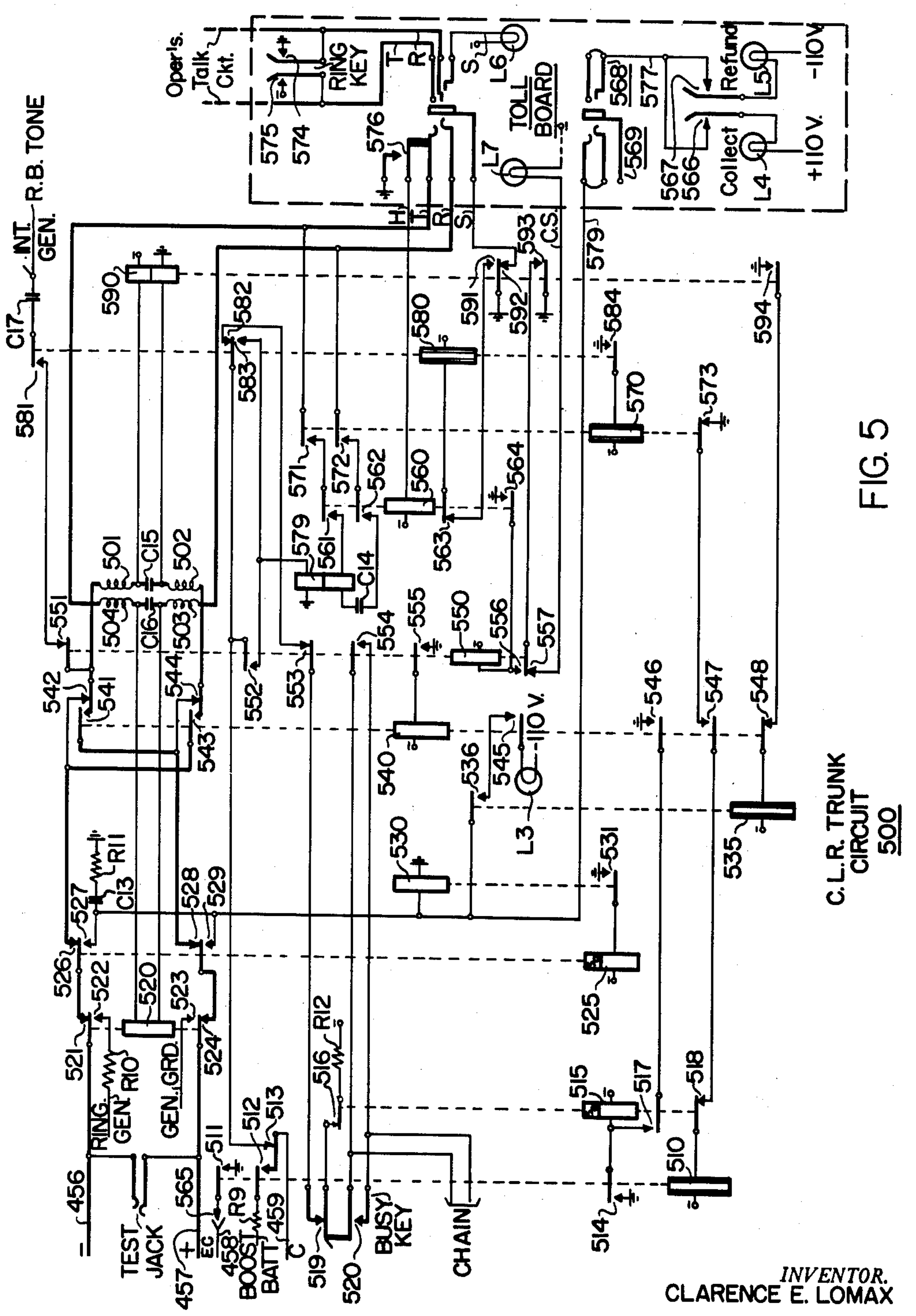
Figure 6:
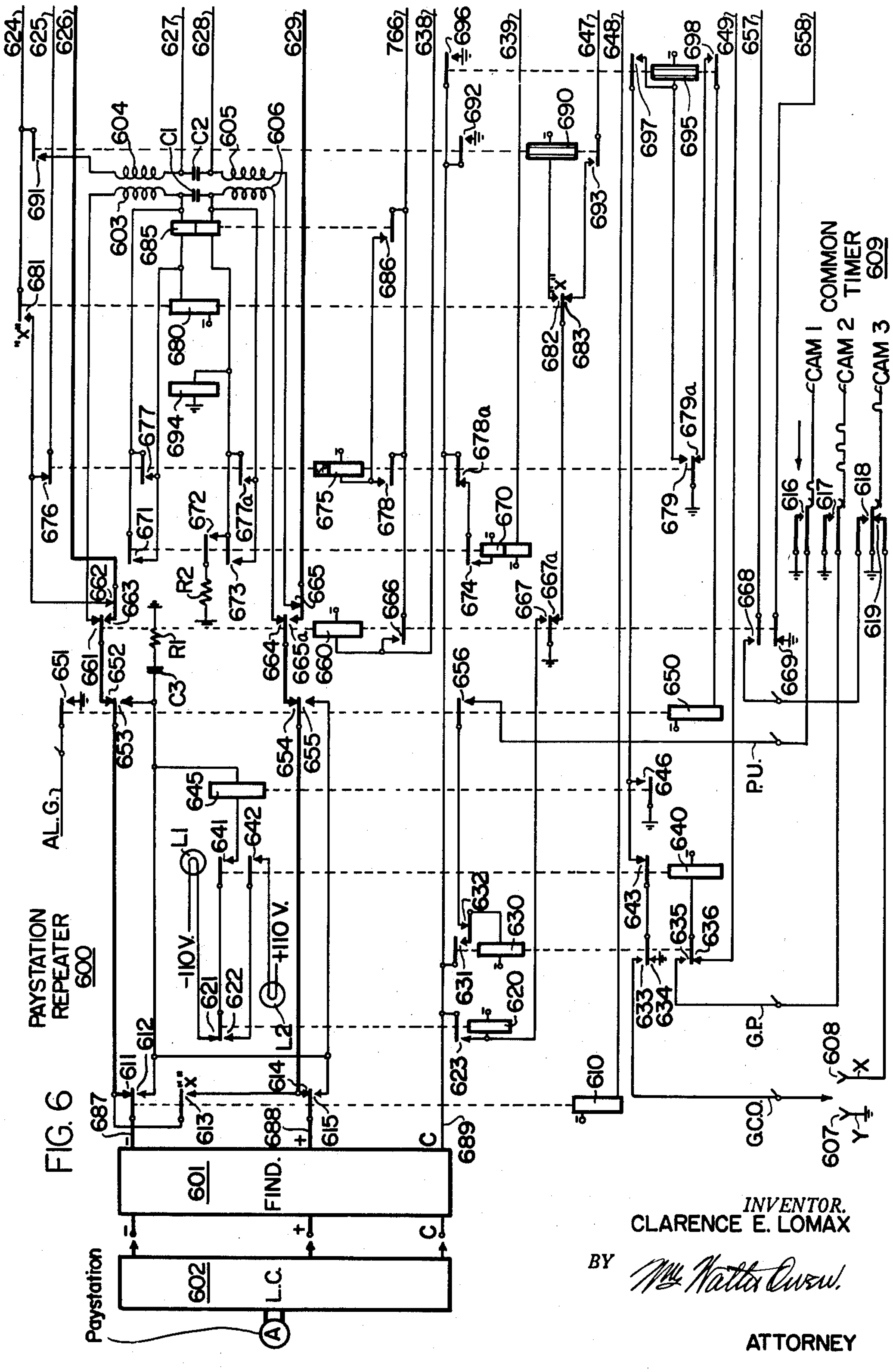
Figure 7:
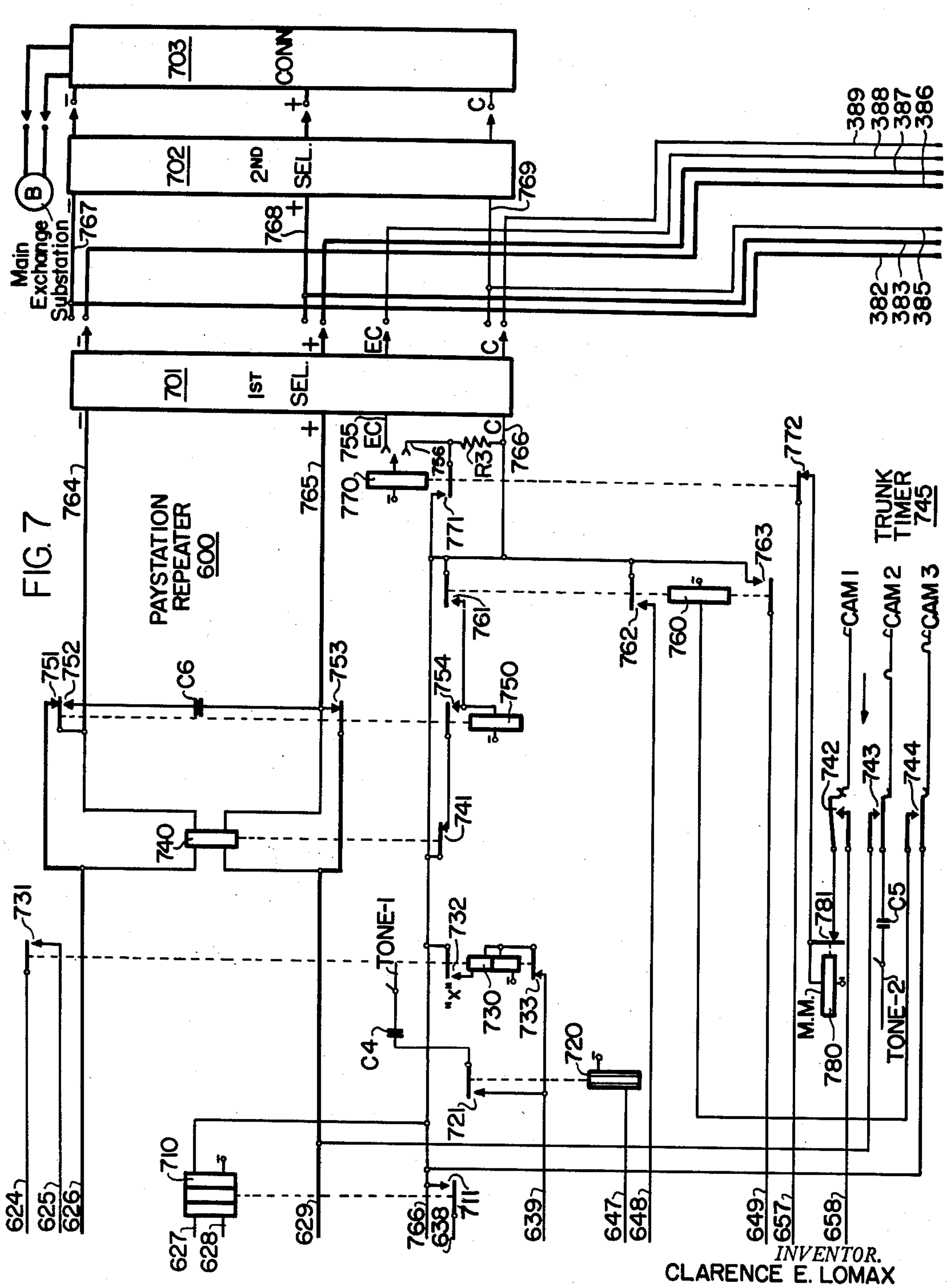
Figure 8:
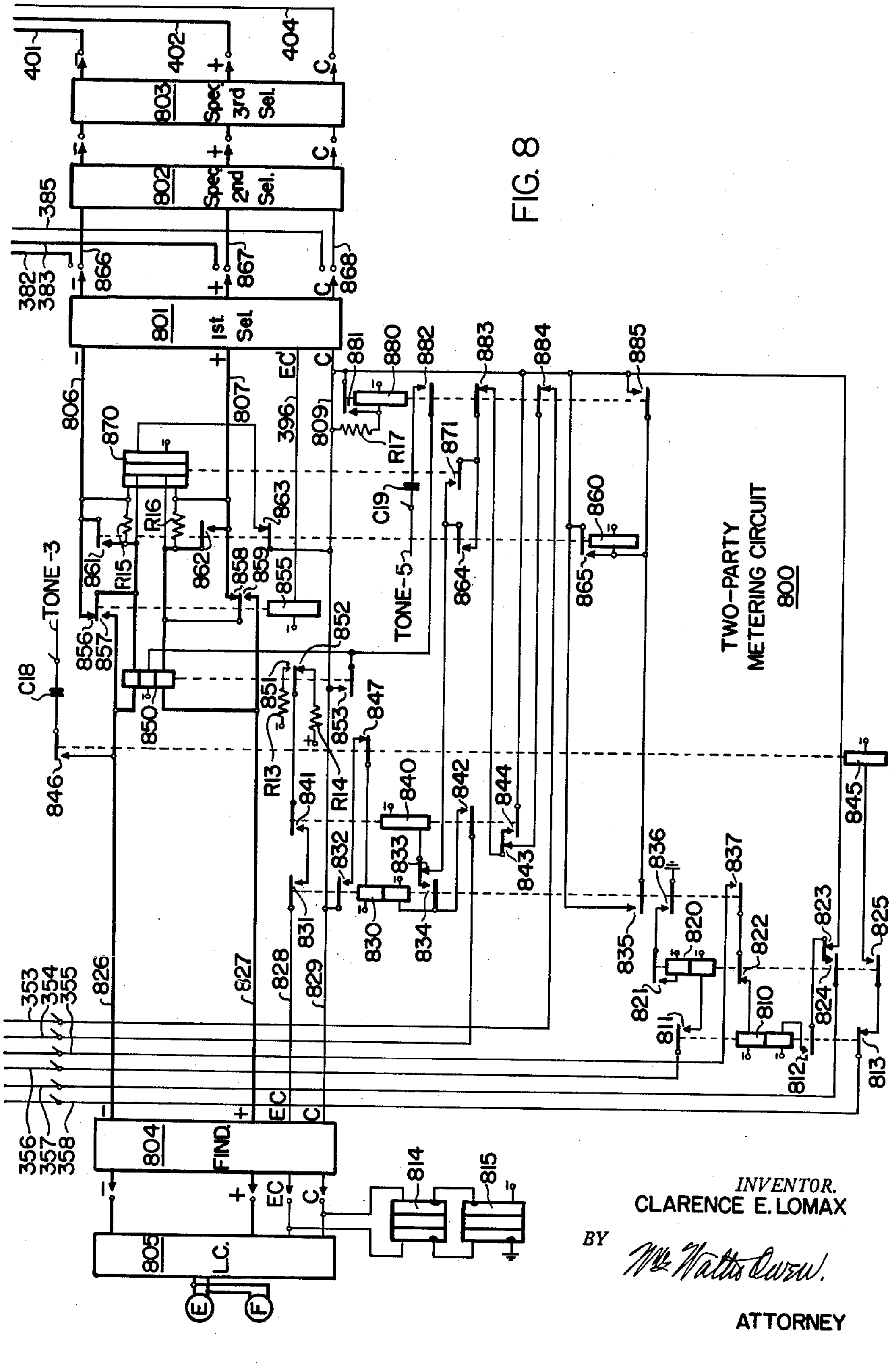

Referring now more particularly to Fig. 1 of the drawings, the telephone system there illustrates a main automatic exchange, M. A. X, with a private automatic branch exchange, P. A. B. X, connected thereto. Finder circuits designated 601, 301, and 804 are of the well-known Strowger type such as is shown in United States Patent 1,849,694, issued to N. H. Saunders, March 15, 1932. The line circuits shown in Figs. 6, 3 and 8 are also of the type disclosed in the above mentioned Saunders patent. Line circuit 391 is slightly different than the others in the drawing—as will be hereinafter explained. Selectors 701, 702, 302, 303, 801, 802, and 803, are all similar to selector 400, which is shown in detail in Fig. 4. Connector 703 is also the well-known Strowger type such as is shown in the United States Patent 2,040,153, issued to Seth Peterson, May 12, 1936. It might be mentioned here that with the exception of line switch 201, all the switches in the system are of the Strowger type. Line switch 201 and selector 202 in the P. A. B. X may be of the type shown in United States Patent 1,842,585, issued to T. F. Crocker, May 6, 1927, wherein certain pre-determined lines only are permitted to access the out-going repeater for effecting calls to the M. A. X and also to the toll operator. The paystation and substations shown are of the conventional type with the exception that certain ones, namely, C, G and F, are provided with a special type of dial in lieu of a conventional one. This type of dial is disclosed in United States Patent 2,366,647, issued to John E. Ostline, January 2, 1945.

Briefly described, paystation A may be connected to any other station in the exchange or to the toll operator for toll service. When a local call is accomplished, a timing arrangement requires the calling party to deposit coins periodically in order to maintain the connection complete. This timing equipment is rendered ineffective however, when the paystation is connected to the toll operator's position. The toll operator will hear a certain tone signal when a paystation is connected thereto. A calling subscriber calling from substation C may effect calls to any substation in the M. A. X—assuming that substation C is one of those stations in P. A. B. X that may access the out-going repeater. Substation C may also be connected through to the toll operator for toll service but if that station is equipped with the special type dial the toll operator will hear a certain tone signal to indicate to her that toll service is not permitted from that particular substation. For illustration purposes substation C is provided with a special type dial but it will be understood that without it toll service would be allowed. Substation D is metered and calls may be accomplished therefrom to the toll operator for toll service and, of course, to any other station in the exchange. The metering equipment is disabled during toll calls. Substation G, as illustrated, is not metered and cannot effect toll calls. As in the case of an attempted toll call from substation C, the special dial thereat will cause a tone to be heard by the toll operator in order to inform her that toll service should be denied. Substations E and F are on a two party line and are separately metered when either one is connected to another station in the exchange. Substation F is equipped with a special type dial in this case in order to facilitate individual metering. These stations, of course, can be connected to the toll operator for toll service and will not be metered during such service.

Having briefly described the invention, a detailed description thereof follows. In this respect, several calls will be described from and to the various types of equipment served, and in this manner, it is believed, a more complete and detailed description will be accomplished.

*Paystation local call*

Assuming now that a paystation, such as A desires to communicate with a party at substation B in the main exchange; the calling party will, of course, initially remove the receiver. The resulting closed loop circuit will therefore operate the line circuit 602 which in turn initiates a finder to search for the calling line. During the time finder 601 is seeking out the calling line, ground will be forwarded therefrom over the C conductor but will have no effect on repeater 600. Finder 601, also while searching, closes a loop circuit to the repeater in order to operate relay 680, over the following path: ground through impedance 694, lower winding of differential relay 685, winding 606 of the repeating coil, contacts 664, 654, 614, positive talking conductor 688, over the closed loop in finder 601, negative talking conductor 687, contacts 611, 652, 661, winding 603 of the repeating coil, upper winding of differential relay 685, through relay 680 to battery. Differential relay 685 will not operate at this time as the circuit thereto is balanced. The closed loop in finder 601 is removed and replaced by the closed loop at paystation A when the calling line is found by the finder. Relay 680, in closing contacts 682, causes relay 690 to operate over an obvious circuit from ground at contacts 667A. Relay 690, in operating and in therefore closing contacts 692, applies ground to the incoming C conductor 689 in order to hold the preceding equipment. Relay 690, being of the slow to release type, will remain operated during pulsing. Relay 680, in closing contacts 681, and relay 690, in closing contacts 691, closes a loop circuit to first selector 701, over the following path: negative talking conductor 764, contacts 751, conductor 626, contacts 662, 681, 691, winding 604 of the repeating coil, conductor 627, left hand winding of shunt field relay 710, conductor 628, winding 605 of the repeating coil, contacts 665, conductor 629, contacts 753, and to positive talking conductor 765. The line relay in first selector 701 will operate in well-known manner and thereby cause ground to be applied to its incoming C conductor 766. Relay 710, being of the shunt field type, will not operate at this time.

The seizure of selector 701 results in dial tone being placed on the line in well-known manner for transmission back to the right hand winding of the repeating coil, over the following path: positive talking conductor 765, contacts 753, conductor 629, contacts 665, winding 605 of the repeating coil, condenser C2, winding 604 of the repeating coil, contacts 691, 681, 662, conductor 626, contacts 751, negative talking conductor 764, and back to first selector 701. This dial tone is, of course, transformed to the left hand winding of the repeating coil for transmission back to the calling party over the following path: winding 603, contacts 661, 652, 611, negative talking conductor 687, through the calling party's receiver, positive talking conductor 688, contacts 614, 654, 664, winding 606, condenser C1 and back to winding 603. Assume that the calling party deposits a coin in the paystation upon hearing dial tone. The positive line is therefore grounded through the coin springs and collect-refund magnet. Differential relay 685, thereupon operates in well-known manner from that ground and in closing contacts 686 causes relay 675 to operate from ground at selector 701 over C conductor 766. Relay 675, at contacts 678 locks itself operated from ground on C conductor 766; at contacts 676, opens the shunting circuit around the pulsing contacts 681; at contacts 677 and 677A shunts differential relay 685 in order to improve pulsing; at 678A opens a point in the holding circuit of relay 670; and at contacts 679 applies ground to operate relay 695. The calling party at paystation A thereupon dials the called party's number. Responsive to the initial pulse of the initial digit dialed, line relay 680 restores and at contacts 683 causes relay 720 to operate, over the following circuit: ground at contacts 667A, contacts 683, 693, conductor 647, through relay 720 to battery. Relay 720, in closing contacts 721, causes ground from C conductor 766 to operate two-step relay 730 via contacts 733. Two-step relay 730 operates just far enough to close its "X" contacts 732. The ground from C conductor 766 also operates relay 670 via contacts 721 and conductor 639. Relay 720, being of the slow-to-release type, will remain operated during the pulsing period of each digit, thereby maintaining relay 670 also operated during the pulsing period of each digit. However, relay 670 will have no utility at this time as differential relay 685 has already been shunted out by contacts 677 and 677A. At the end of the first digit dialled, relay 720 will restore as its energizing circuit is opened at contacts 683; and thereby opens contacts 721. Two-step relay 730 therefore operates completely and closes contacts 731. The closing of contacts 731 will have no effect on the pulsing contacts 681 at this time as contacts 676 have been opened by the operation of relay 675. The pulsing of the first digit to the first selector 701 with the resulting stepping thereof is, of course, accomplished by the energizing and de-energizing of line relay 680, over the following path: negative talking conductor 764, contacts 751, conductor 626, contacts 662, pulsing contacts 681, contacts 691, winding 604, conductor 627, left hand winding of shunt field relay 710, conductor 628, winding 605, contacts 665, conductor 629, contacts 753, positive talking conductor 765, and to the selector.

It might be mentioned at this time that in event the calling party did not deposit a coin, differential relay 685 would not energize and thus relay 675 would not operate. However, as mentioned hereinbefore, contacts 731 are closed after the pulsing of the first digit, thereby permitting successful pulsing of that first digit only, to step the first selector. At the end of that first digit, relay 730 locks itself to ground on C conductor 766 via contacts 732 and thereby maintains contacts 731 closed in order to shunt pulsing contacts 681, via contacts 676 and conductors 624 and 625. Pulsing contacts 681, being shunted, would not accomplish pulsing when line relay 680 thereafter operates intermittently. Thus it should be noted that when making an emergency or free service call a calling party could dial the first digit successfully without depositing a coin; and also if an attempt is made to dial more than one digit the switching equipment will not respond. The voice transmission path would of course include the repeating coils, but relay 685 would be shunted out at contacts 671 and 673 and resistor R2 at contacts 672 would be added in order to improve transmission somewhat. Relay 670 would now be locked operated from ground at contacts 692 via contacts 678*a* and 674.

Returning to the local call to substation B, the succeeding digits after the first will be repeated through paystation repeater 600 and will operate second selector 702 and connector 703 to connect with called line B over line conductors 767 and 768. Ringing voltage is then transmitted to substation B from connector 703 in order to signal the called party thereat. Assuming that the called party at substation B answers, battery will be reversed over the lines from connector 703, in a well known manner, to operate shunt field relay 710. This reversed battery will be impressed across the left hand winding of shunt field relay 710 over the pulsing circuit, hereinbefore traced. The flux now produced by the current in the left hand winding will oppose the flux produced by the current in the right hand winding and the armature will be attracted in order to complete the two magnetic paths. Shunt field relay 710, in operating and in therefore closing contacts 711, causes relay 660 to operate from ground on C conductor 766 via conductor 638 and contacts 711. Relay 660, at contacts 666, locks itself operated from ground on C conductor 766; at contacts 663 and 665A, switches the talking conductors directly through the repeater, by-passing the repeating coil; at contacts 667, closes an obvious energizing circuit to relay 620; at contacts 668, connects common timer 609 to the circuit; and at contacts 669, opens the release circuit for the trunk timer 745. Line relay 680 therefore restores, as its energizing circuit is opened at contacts 661 and 664, and opens contacts 682, causing relay 690 in turn to restore. The relays now operated are 730, 675, 660, 695 and 620. The talking path is therefore completed through repeater 600 and, of course, the associated preceding and succeeding switches so that conversation between the parties may now take place.

As mentioned before, responsive to the answering of the called party, contacts 668 close, thereby completing the circuit from common timer 609 to the individual trunk timer 745. This trunk timer 745 is a 32 position rotary switch with three cams and has a normal position to which it must return at the completion of a call. Common timer 609 serves to time the call as well as other functions hereinafter explained. The rotary switch is the type which advances a step when its magnet circuit is opened. It shall be assumed that common timer 609 sends a ground pulse to trunk timer 745 every ten seconds, namely, contacts 618 close due to the action of its associated cam every ten seconds. This ground connection to operate the trunk timer magnet 780 may be traced over the following path: ground at contacts 618, contacts 668, conductor 657, contacts 772, trunk timer magnet 780 to battery. Magnet 780 will thus cause the trunk timer 745 to step every ten seconds so that approximately five minutes will be required to step the rotary switch to its 32nd position. At the end of the first pulse sent to the magnet 780, cam #1 will close contacts 742, but inasmuch as contacts 669 are now open, the self-interrupting timer circuit will not operate. As the conversation continues, pulses will continue to be transmitted to the trunk timer 745 from contacts 618. When the rotary switch has advanced far enough to allow cam #2 to close contacts 743, tone 2 will be applied to the positive talking conductor 629 through condenser C5 in order to warn the parties that their 5-minute time period has almost expired. Contacts 743 are closed during the stop period so that tone 2 is applied for a full ten seconds. After the warning tone has been transmitted, the calling party may deposit another coin to continue the conversation for another time period. If they wish to continue, the calling party would not deposit another coin until after the first coin is collected. When the cams are advanced to position 32, cam #3 closes contacts 744, causing relay 760 to operate, over the following path: ground on C conductor 766 from the succeeding switch, contacts 744, through relay 760 to battery. Relay 760, in closing contacts 761, causes relay 750 to operate from ground on C conductor 766. Relay 750, in closing contacts 754, locks itself operated from ground on the C conductor through contacts 741; and in closing contacts 752 and in opening contacts 753, causes condenser C6 to be placed across the line conductors and the windings of differential relay 740 to be placed in series with the line conductors, thereby preventing any conversation at this time. In the meantime, relay 760, at contacts 762, has caused relay 610 to operate from ground on C conductor 766 via contacts 762 and conductor 648; and at contacts 763, has caused relay 640 to operate from ground on C conductor 766 via contacts 763, conductor 649 and contacts 636. Relay 610 and relay 640, in operating, cause positive 110 volt collect potential to be applied to the two talking conductors in order to collect the coin over the following path: positive 110 volts, lamp L2, contacts 642, 622, 641, through relay 645, contacts 612 and contacts 615, out over negative talking conductor 687 and positive talking conductor 688, and to the collect-refund magnet at paystation A. Relay 610, in opening contacts 611 and 614, opens the line conductors so that collect potential will only be transmitted back to the calling line; and in closing contacts 613, causes an obvious loop circuit for the out-going line conductors to the called party in order to prevent the switches from releasing.

The calling party at paystation A may either hang up after the coin has been collected or deposit another coin. It should be noted at this point that contacts 744 are closed, to cause the collection of the coin, for the full 10 second period. The trunk timer 745 then steps to the 1st position again. Contacts 744 now open, causing relay 760 to release. Relay 760, in releasing and in therefore opening contacts 762 and 763, causes the release of relays 610 and 640, respectively. Relay 760, in opening contacts 761, will have no effect on relay 750 as that relay is locked operated at contacts 754. Relay 610, in restoring, once again closes the talking conductors of the repeater to the talking conductors of paystation A at contacts 611 and 614. It will be remembered that the two parties cannot converse as relay 740 is in series with the line and as condenser C6 is connected thereacross. Assuming now that the calling party at paystation A deposits another coin, a ground connection will be established through the coin springs and collect-refund magnet to one again unbalance the line. Relay 740, being differentially wound, operates in response to this unbalanced condition in well-known manner. Relay 740, in operating and in therefore opening contact 741, opens the locking circuit of relay 750, allowing it to restore. Relay 750, in restoring and in therefore opening contacts 752, and closing contacts 751 and 753, removes condenser C6 from across the line and once again shunts out the windings of relay 740. Trunk timer 745 continues to step every ten seconds as it did during the first period and will warn the party once again when the second period has just about expired. The calling subscriber at paystation A may continue to deposit coins periodically in order to maintain a complete talking circuit. This process may be continued indefinitely.

It might be noted that while this timing arrangement has been shown as part of the paystation repeater, which is in the primary trunk, a similar arrangement may be had in those cases where the repeater is in the line circuit instead of the trunk circuit. Also, the central office equipment could have been left unchanged and the timer could have been a part of the paystation.

Assume now that the parties terminate their conversation within a 5-minute timing period and replace their respective receivers. The opening of the loop circuit at paystation A will cause the automatic switches to go through the regular process of releasing. When the switches start to release, ground is removed from C conductor 766 in well-known manner; however, finder 601 and line circuit 602 will not be released at this time as relay 695 is locked operated over the following path: ground at contacts 634, contacts 643, 697, through relay 695 to battery. Ground at contacts 696 back over C conductor 689 thus holds the preceding equipment. Removal of ground from C conductor 766 will cause the release of two-step relay 730, relays 675 and 660, locking circuits for these relays having been traced hereinbefore. Relay 660, in restoring and in therefore opening contacts 667, will not cause relay 620 to restore as said relay 620 is now locked operated from ground on C conductor 689 via contacts 623. Relay 675, in restoring and in therefore closing contacts 679A, causes relay 650 to operate, over the following circuit: ground at contacts 679A, contacts 698, through relay 650 to battery. Relay 650, in closing contacts 656, prepares a circuit for pick-up pulse (P. U.) to operate relay 630; and in closing contacts 653, prepares a circuit for transmission of positive 110 v. collect potential back to the calling paystation. When the next ground pulse, caused by cam #1 of common timer 609 closing contacts 616, is applied to relay 630, via contacts 616, 656 and 632, said relay 630 will operate and lock over contacts 631 to the ground on C conductor 689. Relay 630, in opening contacts 634 and in closing contacts 633, applies a different holding ground for relay 695, from either Y wire contacts 607 or from common timer contacts 619 via X wire 608. Relay 630, in closing contacts 635, permits ground pulses, caused by cam #2 of common timer 609 closing contacts 617, to operate relay 640 intermittently. Each time relay 640 operates from one of the ground pulses from common timer 609, positive 110 v. collect potential will be transmitted back out over the calling line via lamp L2, contacts 642, 622, 641, relay 645, contacts 653 and 655, 611 and 614, and back out over the negative talking conductor 687 and positive talking conductor 688 to the collect-refund magnet at paystation A. Relay 645 will operate at this time. Returning now to the operation of relay 630, it will be seen that contacts 634 will open and therefore open the holding circuit of relay 695; but before said relay 695 releases, being of the slow-to-release type, relay 645 will have operated to apply ground at contacts 646 to maintain relay 695 operated. Ground at contacts 696 will therefore continue to hold the preceding equipment.

If the first pulse of current to the collect-refund magnet at paystation A caused by the application of collect-potential successfully operated said magnet, the collect circuit from positive 110 v. collect potential will be opened at the coin springs at the paystation. Therefore when the second ground pulse from common timer 609 operates relay 640, relay 645 will not operate as its circuit is open. Contacts 646 will thus remain open and thereby cause relay 695 to eventually release. Relay 695, in opening contacts 696, causes ground to be removed from C conductor 689, thereby releasing the preceding equipment. The removal of ground from contacts 696 will also release relay 620 and relay 630, energizing circuits having been traced hereinbefore. Relay 695, in opening contacts 698, causes relay 650 to restore, holding circuit therefor having been traced hereinbefore. The equipment is now conditioned for another call. If the first pulse of collect current had failed to collect the coin, the second or perhaps the third pulse would. It will be assumed that if after three trials the coin has not been collected it will be impossible. In this case, and if the X wire is used, responsive to the fourth pulse, ground at contacts 619 will be removed resulting from the action of cam #3, causing relay 695 to restore, as hereinbefore explained. The equipment will thereupon release and another call may be served even though the coin was not collected. If the Y wire is used, relay 695 will be held up indefinitely, causing a continual application of collect pulses to the defective paystation. Thus, if the Y wire is used the trunk may be held busy for a long period due to a defective paystation, but if the X wire is used, the maintenance man has no quick means of locating a mal-functioning paystation. If Y wire is used it should be noted that the alarm, initiated at contacts 651, over AL.G at that repeater, will indicate which trunk is involved.

Assuming now that the party at substation B did not answer, the repeater will not switch through and relays 730, 690, 680, 685, 675 and 695 will be operated—as hereinbefore described. The party at paystation A replaces the receiver, thereby opening the calling loop and allowing relays 680 and 685 to restore. Relay 680, in opening contacts 681, opens the previously described loop circuit to the succeeding switch train, causing it to release; and in opening contacts 682, causes relay 690 to restore. Relay 690, in opening contacts 692, removes ground from the incoming C conductor 689, but another ground at contacts 696 will hold the preceding equipment. When the succeeding switches completely release, resulting in ground being removed from C conductor 766, relays 730 and 675 restore. Relay 675, in opening contacts 679, opens the original energizing circuit for relay 695, but said relay 695 will not restore as it is now held operated through its contacts 697 from ground at contacts 634. Relay 675 in closing contacts 679A, causes relay 650 to operate from ground at contacts 679A via contacts 698. Relay 650, in closing contacts 656, prepares a circuit from common timer 609 to operate relay 630; and in closing contacts 653, prepares a circuit for transmission of negative 110 v. refund potential back to the calling paystation. The process of refunding the coin is similar to that hereinbefore described for collecting with the exception that relay 620 will not be operated at this time, thereby maintaining contacts 621 closed for transmission of refund potential rather than collect potential. It should be remembered that relay 620 operates from reversed battery caused by the answering of a called party—which of course, did not occur. Also as hereinbefore described, when the coin is successfully refunded or after a pre-determined number of unsuccessful attempts, relay 695 will restore, causing the release of the preceding equipment.

*Paystation toll call*

Assuming now that the calling party at paystation A desires to make a toll call and therefore dials a particular number individual to the toll operator's CLR trunk—a three digit number in the present embodiment. The operation of repeater 600 will be identical as that hereinbefore described. The first digit dialled causes first selector 701 to step to its bank contacts terminating conductors 386, 387, 388 and 389 of the second selector 303. The second digit will cause selector 303 to step to its bank contacts terminating conductors 392, 393, 394 and 395. A connection from paystation A to selector 400 has now been established. It will be remembered that the circuit of selector 400 functions adequately for selectors 701, 702, 302, 303, 801, 802 and 803. When selector 400 is seized and a loop circuit in repeater 600 is connected thereto, relay 440 operates, over the following path: ground at the cam springs, through Y wiring, contacts 434, lower winding of relay 440, lower winding of differential relay 430, contacts 423, positive talking conductor 393, through second selector 303, conductor 387, through first selector 701, positive talking conductor 765, repeater loop circuit hereinbefore described, negative talking conductor 764, first selector 701, conductor 386, through second selector 303, negative talking conductor 392, contacts 421, upper winding of differential relay 430, upper winding of relay 440 to battery. In this circuit the Y wiring is used at the cam springs as a source of dial tone is not needed; however, selectors 701, 302 and 801 do require dial tone to be transmitted back to the calling party and therefore X wiring is utilized thereat.

Relay 430, being differentially wound, will not operate at this time. Relay 440, in operating and in therefore closing contacts 441, causes relay 450 to operate from ground at contacts 427 via contacts 441. Relay 450, in operating and in therefore closing contacts 451, prepares a circuit for relay 410; in closing contacts 452, applies ground to incoming C conductor 395 in order to hold the preceding switches, and also to operate relay 460 via vertical off-normal contacts 416; in closing contacts 453, prepares a circuit for vertical magnet 470 and another circuit for relay 460; and at contacts 455, prepares a circuit for rotary magnet 490 and switch through relay 420. Responsive to the first de-energization of relay 440 initiated by the dialling of the third digit, vertical magnet 470 receives a pulse of current over the following circuit: ground at contacts 427, contacts 442, 453, 461, vertical magnet 470 to battery. Relay 450 will have its energizing circuit opened at contacts 441 when relay 440 de-energizes but being of the slow-to-release type will remain operated during the short time between pulses. The operation of vertical magnet 470 results in the well-known stepping operation, causing the wipers to advance one level and also causing the vertical off-normal contacts to operate. The original energizing circuit to relay 460 will then be opened at contacts 416 but the succeeding pulses to vertical magnet 470 will be applied to the lower winding of relay 460 and, being of the slow-to-release type, will remain operated throughout. The succeeding pulses of the third digit will therefore operate vertical magnet 470 over the same path as hereinbefore described and will cause the wipers to step to the desired CLR trunk level. Upon termination of dialling, relay 440 remains energized and in opening contacts 442, causes relay 460 to finally restore. Relay 460, in restoring and in therefore closing contacts 462, completes a circuit to rotary magnet 490. Rotary magnet 490 now operates in a self-interrupted fashion to find an idle CLR trunk, over the following path: ground at contacts 455, contacts 412, 429, 462, 436, vertical off-normal contacts 418, contacts 491, through rotary magnet 490 to battery. Magnet 490 will open its circuit at contacts 491, causing rotary stepping. When the C wiper reaches a bank contact of an idle CLR trunk, such as the one illustrated, negative battery will cause rotary magnet 490 to terminate stepping. This is accomplished by relay 410 as it will operate when an idle CLR trunk is found, over the following path: ground at contacts 451, rectifier 414, through relay 410, C conductor 408, C wiper and bank contact, C conductor 459, contacts 513, 582, 553, 519, 516, resistor R12 to battery. Relay 410, in operating and in therefore opening contacts 412, opens the operating circuit for rotary magnet 490; and in closing contacts 411, causes switch through relay 420 to operate from ground at contacts 455 via contacts 411. Relay 420, in operating and in therefore opening contacts 421 and 423, opens the circuit to relay 440; in closing contacts 422 and 424 switches the talking conductors 392 and 393 directly through the selector; in closing contacts 425, connects the incoming EC conductor 394 with the outgoing EC conductor 407; in closing contacts 426, connects the outgoing C conductor 408 with the incoming C conductor 395; in closing contacts 425A, places ground on EC conductor 396 from C conductor 395, via optional point 439; in opening contacts 427, opens the circuit to relay 450; in closing contacts 428, locks itself operated from ground on C conductor 395; and in opening contacts 429, further opens the operating circuit of rotary magnet 490. It may be mentioned here that EC′ conductor 396 is only utilized at first selector 801—reason therefor being explained hereinafter. The circuit of selector 801 is similar to selector 400 with the exception that the EC′ conductor is used instead of EC conductor 394. Relay 440 now restores, thereby opening the circuit to relay 450 at contacts 441, causing it to restore. Relay 450, in restoring and in therefore opening contacts 452, removes ground from C conductor 395; but before this happens the CLR trunk will return ground over C conductor 408, as will be hereinafter described, and holds the preceding switches, via contacts 426. It should be noted, that the inclusion of an EC conductor is made optional as evidenced by point 419—reason therefor being explained hereinafter. The loop circuit in repeater 600 has now been extended through to talking conductors 456 and 457 of the CLR trunk.

Responsive to the closing of this loop circuit, relay 590 operates over the following path: ground, lower winding of relay 590, winding 502 of the repeating coil, contacts 544, 528, 524, positive talking conductor 457, bank terminal and wiper of selector 400, positive talking conductor 406, contacts 424, positive talking conductor 393, bank terminal and wiper of second selector 303, conductor 387, bank terminal and wiper of first selector 701, positive talking conductor 765, over repeater loop circuit hereinbefore described, negative talking conductor 764, wiper and bank terminal of first selector 701, conductor 386, wiper and bank terminal of second selector 303, negative talking conductor 392, contacts 422, negative talking conductor 405, wiper and bank terminal of selector 400, negative talking conductor 456, contacts 521, 526, 542, winding 501 of repeating coil, through upper winding of relay 590 to battery. Relay 590, in operating and in therefore closing contacts 591, causes relay 580 to operate, via contacts 563; in closing contacts 593, causes the trunk call lamp L7 on the operator's toll board to illuminate, via contacts 557 and conductor CS; and in closing contacts 594 causes slow-to-release relay 535 to operate via contacts 548. Relay 580, in operating and in therefore closing contacts 581, causes ring-back tone to be transmitted back out over the line to the calling party at the paystation, via condenser C17, contacts 581, 551, 542, 526, 521 and conductor 456; in closing contacts 583, places a ground on incoming C conductor 459 from the upper winding of transformer 579, via contacts 583 and 513, to hold the preceding switches; and in closing contacts 584, causes relay 570 to operate over an obvious circuit. Relay 535, in operating and in therefore closing contacts 536, prepares a circuit for negative 110 v. refund potential. Relay 570, in operating and in therefore closing contacts 571 and 572, prepares a circuit for line identification tone to be transmitted to the toll operator; and in opening contacts 573, further disables the circuit to relay 510.

Upon seeing call lamp L7 illuminated, the operator inserts the answer plug of one of her cord circuits into the associated CLR trunk jack. The operator's talk circuit is thereby connected through the tip T and ring R of the answer plug to the talking conductors T and R of the CLR trunk circuit; the hold H conductor is connected to ground at contacts 576 and the sleeve S of the plug is connected to the S conductor of the CLR trunk, thereby preparing a circuit to lamp L6. The closing of contacts 576 completes an obvious energizing circuit for relay 560. Relay 560 therefore operates and, in closing contacts 561 and 562, completes the line identification tone circuit to the toll operator; in opening contacts 563, opens the operating circuit of slow-to-release relay 580; and in closing contacts 564, causes relay 550 to operate over an obvious circuit. Relay 550, in opening contacts 551, opens the previously traced ring-back tone circuit; in closing contacts 552, completes another path to ground at the upper winding of transformer 579 for C conductor 459, thereby shunting contacts 583 (contacts 583 open after a short time as the circuit to slow-to-release relay 580 has been opened); in opening contacts 553, opens the circuit to battery at resistor R12; in closing contacts 554, closes a link in the chain circuit (each separate CLR trunk circuit will control a link and when they are all busy the entire chain will be closed in order to operate an all-trunks-busy meter); in closing contacts 555, causes relay 540 to operate over an obvious circuit; and in closing contacts 556 and opening contacts 557, transfers the ground at contacts 593 from the call lamp L7 to itself, thereby extinguishing lamp L7 and providing a holding circuit.

The paystation identifying tone will originate in the paystation repeater circuit 600 and will be permanently connected to C conductor 766. The toll operator will be apprised of the nature of this calling line over the following path: tone 1 at repeater 600 (Fig. 7), condenser C4, C conductor 766, C wiper and bank terminal of first selector 701, conductor 389, C wiper and bank terminal of second selector 303, C conductor 395, contacts 426, C conductor 408, C wiper and bank terminal of selector 400, C conductor 459, contacts 513, 552, through the upper winding of transformer 579 to ground; and, through the transformer action of 579, from the lower winding thereof, condenser C14, contacts 561 and 562, contacts 571 and 572, T and R conductors, tip T and ring R and to the operator's receiver. Tone 1 will be peculiar to paystations so the toll operator will know that the calling party wishing to make a toll call is calling from a paystation. This tone will be removed at contacts 571 and 572 as slow-to-release relay 580 will finally restore and open the circuit to slow-to-release relay 570 at contacts 584. Relay 570 will finally restore and in opening contacts 571 and 572 disconnects this tone from the operator's talk circuit. The period that the operator does hear the tone is, of course, long enough to identify the line. In the meantime, relay 540, in operating and in therefore closing contacts 541 and 543 and in opening contacts 542 and 544, reverses the battery on the line from relay 590 in an obvious manner; in closing contacts 545, further prepares the circuit for negative 110 v. refund potential and also causes relay 530 to operate, via contacts 545 and 536; in closing contacts 546, prepares a locking circuit for relay 515; in closing contacts 547, prepares a circuit for relay 510; and in opening contacts 548, opens the circuit to slow-to-release relay 535. The complete restoration of relay 570, with the resultant closing of contacts 573, causes relay 510 to operate from ground at contacts 573 via contacts 547 and 518. At this point it should be mentioned that optional wiring EC as evidenced in the CLR trunk circuit as well as in selector 400 and repeater 600 could be used in lieu of booster battery, at resistor R9. Assuming that the EC conductor is utilized throughout the switch train and that the EC conductor is connected to relay 770 in repeater 600, relay 510, in closing contacts 511, causes relay 770 to operate over the following path: ground at contacts 511, optional point 565, EC conductor 458, bank terminal and wiper of selector 400, EC conductor 407, optional point 419, contacts 425, EC conductor 394, bank terminal and wiper of second selector 303, conductor 388, bank contact and wiper of first selector 701, EC conductor 755, through relay 770 to battery. Assuming now that the EC conductor is not connected throughout the train and that booster battery is used, relay 510, in closing contacts 512 and in opening contacts 513, causes relay 770 to operate over the following path: booster battery at the CLR trunk, resistor R9, contacts 512, C conductor 459, bank terminal and wiper of selector 400, C conductor 408, contacts 426, C conductor 395, bank terminal and wiper of second selector 303, conductor 389, bank terminal and wiper of first selector 701, C conductor 766, resistor R3, conductor 756, through relay 770 to battery. It may be noted that relay 770 will not operate through resistor R3 from ground on C conductor 766. Relay 770, in operating and in therefore closing contacts 771, locks itself operated directly to ground on C conductor 766 after relay 510 restores; and in opening contacts 772 opens the previously traced timing circuit to trunk timer 745. It may thus be seen that responsive to answering of the toll operator, the trunk timer will be disabled in order that the calling party at paystation A will not be required to deposit additional coins at periodic intervals during a toll call. Returning now to the operation of relay 510, said relay, in closing contacts 514, causes slow-to-operate relay 515 to operate over an obvious circuit. Relay 515, in operating and in therefore closing contacts 517, locks itself operated from ground at contacts 546; and in opening contacts 518, opens the operating circuit to relay 510, causing it to restore. The slow-to-operate time of relay 515 coupled with the slow-to-release time of relay 510 insures a sufficient period that either ground over EC conductor or booster battery over C is applied to relay 770. It may be mentioned that relay 510 is delayed in operating, at contacts 573, in order that tone identification be transmitted to the toll operator a sufficient duration of time before the incoming C conductor 459 is opened at contacts 513.

Returning now to the battery reversal effected by relay 540, repeater 600, responsive thereto, switches through and connects the calling line directly across the line conductor as hereinbefore explained. Relay 590 is therefore held operated by the calling loop at paystation A. The talking circuit to the toll operator is now established over talking conductors 456 and 457, contacts 521 and 524, contacts 526 and 528, contacts 543 and 541, through windings 502 and 501 of the repeating coil, condenser C15 and relay 590; and then by transformer action from windings 504 and 503, connected by condenser C16, to the toll operator via the T and R conductors. Talking battery will be supplied to paystation A from relay 590. As hereinbefore stated, relay 530 will operate and, in closing contacts 531, causes slow-to-operate relay 525 to operate over an obvious circuit. Relay 525, in closing contacts 527 and 529 completes the negative 110 v. refund potential circuit back to the calling paystation. The refund-collect magnet at paystation A will therefore operate over the following path: negative 110 v. refund potential, lamp L3, contacts 545, 536, 527, and 529, 521, and 524, talking conductors 456 and 457, and back out over the line conductors to the refund-collect magnet at paystation A. Relay 525 has been made slow-to-operate so that the battery reversal causes repeater 600 to switch through before the refund potential is applied to the lines. As hereinbefore stated the operate circuit of relay 535 is opened at the same time that the operate circuit to relay 530 is closed, but as relay 535 is of the slow-to-release type, contacts 536 will remain closed long enough for a pulse of refund potential to be transmitted back out over the lines.

If the operator is doubtful about the identification tone she removes the answer plug. The circuit to relay 560 will therefore be opened at contacts 576, causing it to restore. Relay 580 will now have its previously traced operating circuit closed at contacts 563, causing it to operate; which in turn causes relay 570 to operate at contacts 584. Relay 550 remains operated as it is locked at contacts 593. Relay 550 maintains relay 540 operated at contacts 555. The toll operator may then re-insert the answer plug, causing relay 560 to re-operate with the resulting restoration of relays 580 and 570. However, as relays 550 and 540 are operated, the calling party is not troubled by the battery reversal, the ringback tone cannot be again applied, and the means of refunding cannot be again applied. The identification tone will, however, be transmitted to the toll operator momentarily over contacts 561 and 562, and 571 and 572. Relay 515 will also be held operated during the process of re-establishing the identification tone at contacts 546; thereby preventing relay 510 from operating at contacts 518 to apply booster battery to C conductor 459; the C conductor remains connected at contacts 513 for completing the tone transmission path. The operator can, of course, remove and re-insert the plug any number of times.

The toll operator may now converse with the calling party in order to ascertain the desired called station; and may thereafter establish the toll connection in well-known manner. If the operator wishes to manually collect or refund coins at anytime, she can do so by inserting the coin plug into the coin jack associated with that particular trunk. Assuming that coins are to be manually collected, key 566 will be closed in order to accomplish it. Relay 530 therefore operates from positive 110 v. collect potential over the following path: positive 110 v., lamp L4, contacts 566, conductor 577, coin plug 568, trunk coin jack 569, conductor 579, through relay 530 to ground. Relay 530, in operating and in therefore closing contacts 531, causes relay 525 to operate; which in turn connects the talking conductors to the coin collect-refund potential circuit at contacts 527 and 529. Coin collect potential will then be transmitted back to paystation A over the following path: positive 110 v. collect potential, lamp L4, collect key 566, conductor 577, coin plug 568, coin jack 569, conductor 579, contacts 527 and 529, contacts 521 and 524, talking conductors 456 and 457, and back out over the talking conductors to the collect-refund magnet and coin springs at paystation A and to ground thereat. The toll operator may determine whether the collect-refund magnet has operated successfully by opening the collect key and re-operating it again. If the coins have been disposed of the coin springs at the paystation will be opened, thereby opening the coin collect circuit and thus preventing lamp L4 from illuminating. Lamp L4 will not light through the high resistance winding of relay 530. Refund voltage may be transmitted back to the collect-refund magnet at paystation A in a familiar manner as collect voltage—except this time the refund key would, of course, be manually operated and contacts 567 would complete the circuit.

When the parties terminate their conversation the calling party at paystation A re-places the receiver, thereby opening the calling loop. Relay 590, circuit having been traced hereinbefore, therefore restores and at contacts 592 causes the disconnect lamp L6 to operate via the sleeve S conductor. The switch train will not release at this time as relay 550 is being held operated at contacts 564 and relay 540 is being held operated at contacts 555. Should the toll operator find it necessary to ring the party at paystation A she can do so by operating the ring key. Relay 520 will therefore operate over the following circuit: ground at contacts 574 of the ring key, ring R conductor of the answer plug, the R conductor of the trunk jack, winding 503 of the repeating coil, through relay 520, winding 504 of the repeating coil, T conductor, tip T conductor of answer plug, contacts 575 of the ring key to battery. Relay 520, in closing contacts 522 and 523, places the ringing generator directly across the talking conductors in order to ring the calling party. When the toll operator removes the answer plug from the trunk jack, the circuit to relay 560 will open at contacts 576, causing it to restore. Relay 560, in restoring and in opening contacts 564, causes relay 550 to restore; which in turn causes relay 540 to restore. Relay 550, in opening contacts 552 removes ground from C conductor 459, thereby causing relay 420 to restore as it is also being held operated from the ground coming back from the CLR trunk over C conductor 408, via contacts 426 and 428. Relay 420, in restoring and in therefore opening contacts 422 and 424, disconnects the incoming talking conductors from the CLR trunk; and in closing contacts 427, causes release magnet 480 to operate, over the following path: ground at contacts 427, contacts 442, 454, 433, 417, through the release magnet 480 to battery. Magnet 480 restores the Strowger type switch to normal in a well-known fashion. The preceding switches are likewise released in the same manner. It should be noted that paystation repeater 600 will automatically collect the coins responsive to the release of the switch train—as hereinbefore described—so if the toll operater fails to manually do so, the repeater will. The equipment is now ready for subsequent calls.

*P. A. B. X substation call to local substation in M. A. X*

A call from a subscriber at substation C to a subscriber at substation B will now be considered. As mentioned hereinbefore, only certain of the substations in the P. A. B. X will be permitted to access the outgoing repeater for calls to the M. A. X; it will be assumed that substation C is not restricted. When the calling party at substation C removes the receiver, line switch 201 will be initiated to find an idle selector, such as 202, in well-known manner. It may be mentioned here that a line switch is shown in the drawings as the hereinbefore cited U. S. Patent 1,842,585, disclosing a P. A. B. X, included such apparatus. It should be understood that an individual line circuit and finder could have been substituted in lieu thereof. The calling party will then hear dial tone and in response thereto would dial the first digit—a number individual to the outgoing trunk repeater. Upon seizing repeater 200, battery through resistance R19, contacts 217 and over C conductor 279 will cause the preceding equipment to switch through.

Responsive to the completion of a loop circuit to repeater 200, relay 225 operates over the following path: ground, lower winding of relay 225, lower winding of differential relay 230, winding 208 of the repeating coil, contacts 223, positive talking conductor 278, over the calling loop, negative conductor 277, contacts 221, winding 205 of the repeating coil, through upper winding of differential relay 230, through upper winding of relay 225 to battery. Relay 225, in operating and in therefore closing contacts 226, causes the line relay (not shown) in line circuit 391 to operate over the following path: ground at contacts 264, contacts 226, winding 207 of the repeating coil, right hand winding of shunt field relay 240, relay 245, winding 206 of the repeating coil, negative talking conductor of trunk 204, line relay in line circuit 391 to battery. It should be noted that the only difference between the trunk line circuit 391 and the others shown in the drawings is that ground is not connected to one side of the line through contacts of the cut-off relay. This practice is well-known in the art. The line relay in the line circuit will therefore operate from ground at the repeater and will initiate line finder 301 to search for the calling line. Relay 245 would also operate at this time; relay 240 being of the shunt field type would not. Relay 225, also, in closing contacts 227, causes relay 250 to operate over an obvious circuit. Relay 250, in operating and in therefore opening contacts 251, opens the circuit to relay 275; in closing contacts 253, causes relay 215 to operate; in closing contacts 254, prepares a circuit to relay 270; and in opening contacts 255 opens another point in the answer lamp L4 circuit. Relay 215, in operating and in therefore closing contacts 217A, places ground on C conductor 279 in order to hold the preceding switch train; in closing contacts 218, closes the energizing circuit to the left hand winding of shunt field relay 240; and in closing contacts 219, causes busy lamp L3 to illuminate, thereby informing the attendant in the P. A. B. X that this trunk is in use. Shunt field relay 240 will not operate at this time as the voltage applied to each winding is of such polarity that the flux produced by the resulting two currents will be aiding, confining the magnetic paths to the core itself and thereby exerting no influence on the armature. Relay 245, in operating and in therefore closing contacts 246, prepares a circuit for relay 260. When the calling line is found by finder 301, ground will be returned over the positive line conductor and thereby causes relay 260 to operate, via contacts 252, 263 and 246. Relay 260, in operating and in therefore opening contacts 261 and 264 and in closing contacts 265, completes the trunk connection; and in opening contacts 263 and in closing contacts 262, locks itself operated, via contacts 246. A calling loop will now be extended to finder 301 over the following path: wiper and bank terminal of finder 301, conductor 318, negative talking conductor of trunk 204, winding 206 of the repeating coil, through relay 245, right hand winding of shunt field relay 240, winding 207 of the repeating coil, contacts 226, 265, positive talking conductor of trunk 204, conductor 327 to the bank terminal and wiper of finder 301.

The calling loop is now extended through metering circuit 300 to first selector 302, via talking conductors 378 and 379, the two left hand windings of shunt field relay 380, and talking conductors 376 and 377. Selector 302 is therefore seized and returns ground back over C conductor 348. This ground completes an energizing circuit to the right hand winding of shunt field relay 380, via contacts 373, but being of the shunt field type does not operate. Ground from C conductor 348 is also applied to relay 360, but it will not operate as it is in series with resistor R8. A second dial tone is then transmitted back to the calling party in the P. A. B. X, originating at selector 302. The circuit of selector 302, being similar to that disclosed for selector 400, will require "X" wiring rather than "Y" wiring at the cam springs in order that dial tone will be impressed on the line. The equipment from substation C in the P. A. B. X to selector 302 in the M. A. X is now conditioned for subsequent dialling.

Upon hearing this second dial tone the calling party at substation C dials the number individual to the calling party in the M. A. X. Relay 225 restores and re-operates—as it is in series with the dial at substation C—and causes the loop circuit to selector 302 to open and close at contacts 226. Selector 302 is thereby stepped to the desired level and in turn rotary steps to an idle second selector. The calling loop would now be extended to second selector 702 via conductors 382 and 767, 383 and 768. Second selector 702 and connector 703 will be subsequently stepped in well-known manner to the bank terminals of substation B. While relay 225 is following the impulses, a circuit to relay 270 will be intermittently closed via contacts 228 and 254; and as relay 250 and said relay 270 are of the slow-to-release type, they will remain operated during the pulsing of each digit. Relay 270, in operating and in therefore closing contacts 272, places resistor R5 across winding 206 of the repeating coil in order to improve dialling; and in closing contacts 273, closes a multiple circuit to relay 260. The relays now operated in repeater 200 are 225, 245, 215, 250, 260, and 270.

The called party at substation B now hears the ringer thereat; and responsive to answering, battery will be reversed back over the calling conductors. The circuit is now conditioned for subsequent conversation. Shunt field relay 380 now operates as the voltage impressed on the left hand winding is of such polarity that the armature will be actuated. The battery reversal will similarly cause shunt field relay 240 to operate and at contacts 241 a circuit is closed to operate relay 235 from ground at contacts 218. Relay 235, in closing contacts 236 and 237, shunts the windings of relay 230 in order to provide more transmitter current from relay 225 to the calling substation; and in closing contacts 238, locks itself operated from ground at contacts 218. Relay 380, in operating and in therefore closing contacts 381, causes relay 330 to operate the next time cam #1 of common timer 390 closes contacts 306, via conductor 353, contacts 333, 381, 343 and 362. It might be mentioned here that the cams of common timer 390 are constantly rotating. Relay 330, in operating and in therefore closing contacts 334, locks itself operated from ground on C conductor 348, via contacts 362, 343, 381 and 334; in closing contacts 331, prepares the metering circuit; and in closing contacts 332, prepares a circuit for relay 340. The next time cam #2 closes contacts 307, relay 340 will operate, via conductor 354, and contacts 332. Relay 340, in operating and in therefore closing contacts 341, applies ground to individual line meter 338, via contacts 331, EC conductor 359, wiper and bank terminal of finder 301, conductor 329, meter 338 to battery. The meter will, of course, operate once. Relay 340, in opening contacts 343, opens the previously traced holding circuit for relay 330 but relay 330 will remain operated from the ground pulse originating at contacts 307, via conductor 354, contacts 332, 344 and 362. Relay 340, in closing contacts 342, locks itself operated to C conductor 348; in closing contacts 345, prepares an operating circuit for relay 320; in closing contacts 346, causes relay 370 to operate from ground on C conductor 348; and in closing contacts 347, prepares a circuit for relay 310. Upon termination of the ground pulse at contacts 307, relay 330 will restore and, in opening contacts 331, opens the circuit to meter 338. Relay 370, in operating and in therefore closing contacts 371 and 372, shunts the left hand winding of shunt field relay 380 and in opening contacts 373 opens the operating circuit of the right hand winding of relay 380 thereby causing shunt field relay 380 to restore, in order to improve transmission; in closing contacts 374, shunts contacts 381 which will open as soon as relay 380 restores; and in closing contacts 375, locks itself operated from ground on C conductor 348. The next time cam #3 closes contacts 308, relay 310 will operate, via conductor 355, contacts 347 and 322. Relay 310, in operating and in therefore closing contacts 311, prepares an operating circuit for relay 320; in closing contacts 312, locks itself operated from ground on C conductor 348, via contacts 323; and in opening contacts 313, opens the operating circuit of relay 350. The next time cam #4 closes contacts 309, relay 320 will operate, via conductor 356 and contacts 311. Relay 320, in closing contacts 321, locks itself operated from ground at contacts 345; and in closing contacts 325, prepares a circuit for relay 350. Relay 320 opens the original operating circuit of relay 310 at contacts 322, but in closing contacts 324 maintains relay 310 operated from ground at contacts 314, via conductor 357, contacts 324 and 312. The next time cam #5 opens contacts 314, relay 310 will restore and in closing contacts 313, prepares an operating circuit for relay 350, via contacts 313 and 325. The next time cam #6 closes contacts 315, relay 350 operates, via conductor 358, contacts 313 and 325. Relay 350, in operating, and in therefore closing contacts 351, places a warning tone (tone 3) on the line in order to advise the parties that the call is soon to be metered once again; and in opening contacts 352, causes relay 340 to restore. Relay 340, in restoring and in therefore opening contacts 345, causes relay 320 to restore, thereby removing tone 3 from the line and preparing the holding circuit for relay 340. The call will now be metered if not released before cam #1 closes again. This repeated metering process could go on indefinitely.

When the parties terminate their conversation and replace their respective receivers, relay 225 will restore. Relay 225, in opening contacts 226, opens the loop circuit to the succeeding switch train, causing it to release and also opens the circuit to relay 245; in opening contacts 227, causes slow-to-release relay 250 to restore; and in closing contacts 228, causes relay 270 to operate momentarily, via contacts 254, before relay 250 completely restores. Relay 270, in opening contacts 271, removes relay 290 from the negative line; and in closing contacts 272, places a resistance shunt around winding 206. Relay 245, in restoring and in therefore opening contacts 246, causes relay 260 to restore. Relay 250 finally restores and at contacts 254 opens the circuit to relay 270; and at contacts 253 opens the operating circuit of relay 215. When the succeeding switches release, ground will be removed from C conductor 348 and any relay in metering circuit 300 that is operated at that time will restore. The equipment is now ready for future calls.

*P. A. B. X substation toll call*

It will now be assumed that the calling party at substation C wishes to make a toll call. As mentioned hereinbefore, the dial at substation C is of the special type—namely, the dial will cause the line to be momentarily grounded at the end of each digit dialled. It should be understood that substation C could or could not have been provided with a special type dial—the difference being that without it toll calls would be permitted therefrom whereas with a special type dial toll service would be denied. Repeater 200 will function exactly as hereinbefore explained during the dialling of the toll operator—requiring three digits. Relay 230 will operate momentarily at the end of each digit dialled as ground from the substation caused by the special type dial will unbalance the circuit thereto. Relay 230, of course, also operated momentarily when a connection was established between substation C and substation B, but had no effect. Contacts 231 will close, thereby placing ground on the positive line, via contacts 265, to the succeeding switches. The momentary ground at the end of the first digit will have no effect on first selector 302 and similarly the ground at the end of the second digit will have no effect on second selector 303; but after the third selector 400 is stepped to the CLR trunk level, the succeeding momentary ground connection to the positive talking conductor 393 will unbalance the circuit to the differential relay 430, causing it to operate. Relay 430, in operating and in therefore closing contacts 431, locks itself operated from ground on C conductor 408, via contacts 426, normal post springs 415 and contacts 431. The normal post springs would only close on the level that the CLR trunks are connected to; thus preventing relay 430 from remaining operated on any calls except those to the toll operator. Relay 430, in closing contacts 432, applies tone 4 to the outgoing C conductor 408, via optional point 413, condenser C12, contacts 432 and 426. An identifying tone is therefore transmitted to the CLR trunk in the same manner as tone 1 was in the case of a paystation toll call. It may be mentioned here that inasmuch as the circuit of selector 400 is used for other selectors in the system, as hereinbefore stated, tone 4 could be disconnected at optional point 413 where it is not needed—which will actually be all the other selectors in the exchange.

A connection will now be established from substation C to the CLR trunk, via trunk 204, conductors 318 and 327, bank terminals and wipers of finder 301, talking conductors 378 and 379, left hand windings of shunt field relay 380, talking conductors 376 and 377, wipers and bank terminals of first selector 302, conductors 364 and 365, wiper and bank terminals of second selector 303, talking conductors 392 and 393, contacts 422 and 424, and talking conductors 405 and 406. CLR trunk 500 will now function exactly as hereinbefore described and responsive to the answering by the toll operator, relay 510 will operate and cause booster battery to be transmitted back out over C conductor 459. This booster battery will cause relay 360 to operate via C conductor 408, contacts 426, C conductor 395, bank terminal and wiper of second selector 303, conductor 367, bank terminal and wiper of first selector 302, C conductor 348, and resistor R8. Relay 360, in closing contacts 361, locks itself operated from ground on C conductor 348; in closing contacts 363, causes relay 370 to operate also from ground on C conductor 348; and in opening contacts 362, opens the circuit to relay 330, thereby preventing it from operating and thus preventing meter 338 from operating. Thus it is seen that the metering equipment is disabled during toll service. Relay 370, in closing contacts 371 and 372, shunts the shunt field relay 380 for effecting better transmission.

The toll operator would hear tone 4 and would therefore be apprised of the fact that substation C is not allowed toll service. She may then inform the calling party of the restricted nature of substation C. Upon termination of the conversation, the switch train would release as hereinbefore explained. It may be mentioned here that if the dial at substation C had not been of the special type, tone 4 would not be transmitted to the toll operator and she in turn would extend the toll call.

*Local call from a metered single party line*

A call from a calling party at substation D to a party at substation B would be handled similarly to that hereinbefore described for a call from a party at substation C. Line circuit 305 would operate from the closed loop at substation D and in turn would initiate finder 301 to search for the calling line. Substation D would then be connected to finder 301 over conductors 317, 326, 328 and 336. The apparatus would thereafter function exactly as hereinbefore described for the call from substation C and meter 339 would register as meter 338 did in the previously considered call.

*Toll call from a metered single party line*

A toll call from a calling party at substation D would be handled in a similar manner as a toll call from a party at substation C. The metering equipment would also be similarly disabled. However, substation D is not equipped with a special type dial and thus tone 4 will not be transmitted to the toll operator. Toll service would then be available to the party at substation D. Release of the connection would also be similar to that hereinbefore explained.

*Local call from a non-metered single party line*

A local call from a party at substation G to a party at substation B would be handled similarly to that hereinbefore described for a call from substation D, with the exception that no meter would be actuated—as is evidenced from the drawings.

*Toll call from a restricted local single party line*

A call to the toll operator from a calling party at substation G would be handled similarly to that hereinbefore described for a toll call from substation D, with the exception that the special type dial at substation G would cause tone 4 to be transmitted to the toll operator. Toll service would therefore be denied.

*Local call from a substation on a metered two-party line*

A call from a party at substation E or substation F to a party at substation B would be handled in much the same way as a call from substation D. Metering circuit 800 is very similar to metering circuit 300—the difference being that circuit 800 is adapted to meter either one of the two parties on a line. The operating magnets of the two meters, associated with any one line, will be of the shunt field type—814 for substation E and 815 for substation F. These magnets are so wound that when negative potential is applied to the left hand windings, only magnet 815 will operate to register the call; whereas when positive potential is applied to the left hand windings, only magnet 814 will operate to register the call. Assume now a party at substation F dials the number individual to substation B. Inasmuch as substation F is equipped with a special type dial, upon termination of the first digit dialled, first selector 801 will have stepped to the desired level over talking conductors 826 and 827, windings of differential relay 850, contacts 856 and 858, and talking conductors 806 and 807; and differential relay 850 will have operated over its unbalanced circuit thereto due to the ground at substation F. Relay 850, in closing contacts 851, prepares a negative potential circuit for metering substation F; and in closing contacts 853, locks itself operated from ground on C conductor 809. As mentioned hereinbefore, first selector 801 is similar to the circuit of selector 400 with the exception that EC′ conductor 396 is utilized instead of the regular EC conductor, and also tone 4 is not connected. X wiring at the cam springs would be used, however, as first selector 801 originates dial tone for the calling party. At the end of the first digit, and therefore after first selector 801 has switched through, relay 855 will operate from ground on the C conductor of selector 801, via optional point 439, contacts 425A and EC′ conductor 396. Relay 855, in closing contacts 857 and 859 and in opening contacts 856 and 858, shunts the windings of differential relay 850 and places the left hand windings of shunt field relay 870 in the pulsing circuit. The windings of differential relay 850 are shunted in order to improve pulsing and subsequent voice transmission. The second digit will step second selector 702 over conductors 382, 383 and 385 and the third and fourth digits will step connector 703 to the bank terminals of called substation B. When the called party answers and battery is reversed over the line, shunt field relay 870 will operate exactly as the similar relay did in metering circuit 300. The repeated metering apparatus in circuit 800 will function similarly to circuit 300—the circuits of relays 810, 820, 830, 840, 845, 860, 870 and 880 being similar to 310, 320, 340, 330, 350, 370, 380 and 360, respectively, as can be noted from the drawings. Thus every time relay 840 operates, followed by the operation of relay 830, negative potential will be impressed on the left hand windings of magnets 814 and 815, via resistor R13, contacts 851, 841, 831 and EC conductor 828, resulting in the operation of the meter associated with magnet 815 only. It may be noted here that had the call been extended from substation E, relay 850 would not be operated (as substation E does not have a special type dial) and consequently positive potential via resistor R14 and contacts 852 would be impressed on the left hand windings of the meters, resulting in the operation of the meter associated with magnet 815. The release of this metering circuit is similar to that hereinbefore described for metering circuit 300.

*Toll call from a substation on a metered two-party line*

A toll call from either substation E or substation F would be handled much in the same manner as a similar call from substation D. The three digits dialled would successively step first selector 801, second selector 802 and third selector 803 in order to access the CLR trunk. Responsive to the answering of the toll operator, booster battery would be transmitted back to relay 880, via C conductor 459, conductors 404 and 868, and C conductor 809. Relay 880 would operate in a similar manner as would relay 360 and consequently would disable the metering equipment. Thus repeated metering will not be accomplished during a toll call from a two-party line. Relay 880, in closing contacts 882, causes an identification tone (tone 5) to be applied to the C conductor (if the toll call is from substation F, thereby resulting in the operation of relay 850), via contacts 853. Thus station identification tone is transmitted to the toll operator over the C conductor as tone 1 was in the case of a paystation toll call. Thus the operator has a means of identifying the station on a two-party line. If a line vertification circuit, such as, for example, the circuit disclosed in U. S. Patent 1,672,336, issued to J. E. Ostline, June 5, 1928, is incorporated in the system the operator will be able to verify the line and the station on that line. It may be noted at this point that the link circuit to a CLR trunk by-passed selector 400. This is necessary as ground, caused by a special type dial, at one of the substations on a two-party line determined the substation metered. If selector 400 had not been by-passed this ground connection would have effected a transmission of tone 4 to the toll operator to give her a false identification. The circuit would be released in a similar manner as hereinbefore described.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is:

1. In a telephone system, a plurality of paystation subscriber lines, a paystation repeater common to said lines, means for connecting a calling one of said lines to said repeater, transmitting means controlled by the calling subscriber for transmitting series of impulses, a line relay in said repeater operated by each series of impulses transmitted by said transmitting means, selecting means operated by said line relay to extend said connection to a called station, disabling means in said repeater operated in response to the termination of the last impulse of a first transmitted series of impulses for preventing the subsequent operations of said line relay by subsequent transmitted series of impulses from further operating said selecting means, and enabling means in said repeater operated responsive to the deposit of a coin at the calling paystation for nullifying said disabling means whereby said subsequent operations of said line relay are effective in response to said subsequent transmitted series to further operate said selecting means to complete the desired connection.

2. In a telephone system, a plurality of paystation lines, a repeater common to said lines, means for connecting a calling one of said lines to said repeater, transmitting means controlled by the calling subscriber for transmitting series of impulses, a pulsing circuit including pulse repeating contacts in said repeater, a line relay in said repeater operated by each series of impulses transmitted by said transmitting means for operating said pulse repeating contacts to repeat impulses over said pulsing circuit, a normally open shunt circuit around said pulse repeating contacts, means in said repeater operated in response to the termination of the last impulse of a first series of transmitted impulses for closing said shunt circuit around said pulse repeating contacts to prevent said contacts from repeating pulses over said pulsing circuit by subsequent operations of said line relay, and means in said repeater operated responsive to the deposit of a coin at the calling paystation line for opening said shunt circuit to permit said contacts to repeat impulses over said pulsing circuit.

3. In a telephone system, a plurality of paystation lines, a plurality of substation lines, means operable to connect any one of said paystation lines to any one of said substation lines, means associated with each of said paystations for transmitting series of impulses, a line relay having pulsing contacts in said connecting means, said line relay operated responsive to the receipt of a first series of impulses for causing said connecting means to connect a calling paystation line to a called station, means responsive to the termination of said first series of impulses of shunting the pulsing contacts on said line relay thereby preventing the extension of subsequent series of impulses, and means operated responsive to the deposit of a coin at said calling paystation line for opening the shunt thereby allowing the extension of said subsequent series of impulses.

4. In a telephone system, a party line having a first and a second substation thereon, a first meter individual to said first substation, a second meter individual to said second substation, a station identifying tone source individual to said first station for indicating when said first substation is calling, a dial at each of said substations for transmitting switch operating pulses, means in the dial of only said first substation for momentarily transmitting a ground pulse during operation, a toll trunk terminating in an operator's position, means controlled by the switch operating pulses transmitted from the calling substations dial for establishing a connection over said trunk to said operator's position, station identifying means operated only in response to said momentary ground pulse transmitted from the dial of said first substation for conditioning only said first meter and said tone source for operative connection, said second meter being conditioned for operative connection only in case said station identification means are not operated, disabling means operated responsive to said operator answering a toll call from one of said substations for disabling said conditioned meter associated with said calling substation and for connecting said tone source to said toll trunk in case said toll call is from said first substation, and means in said toll trunk for audibly connecting said connected tone source to said operator responsive to the operator answering a toll call from said first station.

5. In a telephone system, party lines, a first and a second station on each of said lines, a meter individual to each of said stations, an operator's position, a trunk terminating in said position, means including a two-party metering circuit for completing a local call from a calling one of said lines to a called line or for initiating a toll call from said one calling line by connecting said calling line to said operator position over said trunk, station identifying means in said circuit for selecting the first station meter of said calling line in case said first station on said calling line originated the call or for selecting the second station meter of said calling line in case said second station on said calling line originated the call, metering means for operating the selected station meter in response to the local call being answered, and means in said metering circuit operated in response to the operator at said positioned answering an initiated toll call for disabling said metering means to prevent operation of the selected station meter.

6. In a telephone system as claimed in claim 5 including a tone source for identifying the first station of a calling line, and means controlled jointly by said identifying means and said disabling means for connecting said source to the operator at said position.

7. A telephone system, classes of calling subscriber lines arranged in different class groups, a toll trunk terminating in an operator's position, means controlled from any calling one of said subscriber lines for completing a connection from said calling line to said trunk, answering means in said trunk operated in response to the operator at said position answering the call received by said trunk, call charging means individual to each calling subscriber line, a common charge control means for each different class group of calling subscriber lines and included in said completed connection, dependent upon the class of said calling line, operating means in said common charge control means for operating the individual charging means of the connected calling subscriber line, starting means in each common charge control means for initiating the operation of its respective operating means, trunk controlled means operated by said answering means for sending a first signal back towards said calling station, means in said connected common charge control means operated by said signal for conditioning its respective starting means for operation, a second trunk controlled means operated by said answering means for sending a second signal back towards said calling line, and disabling means in each common charge control means, said disabling means associated with said class group containing the calling line operated by said second signal for disabling its respective conditioned starting means to prevent the operation of its respective operating means to thereby prevent the operation of the calling subscriber's individual charging means on calls extended to said trunk.

8. In a telephone system, a group of local paystation subscriber lines each having an individual paystation, a paystation repeater common to said group of paystation subscriber lines for controlling collection of deposited coins in a calling paystation, said paystation repeater being normally operative in response to the receipt of reversal of battery for preparing for the collection of coins deposited in the calling paystation on local calls between local subscriber lines, a paystation tone source in said repeater for indicating a calling paystation, a group of local metered single party subscriber lines including both restricted and unrestricted subscriber lines, an individual meter for each single party subscriber line, a metering control circuit common to said group of local metered single party subscriber lines for controlling the operation of a calling single party's individual meter, said metering control circuit being normally operative in response to the receipt of reverse battery for preparing for the operation of the calling single party's individual meter on local calls between local subscriber lines, a restricted service tone source for indicating a calling restricted single party subscriber line, a group of local metered two-station subscriber lines, an individual meter for each first station and an individual meter for each second station for each two-station subscriber line, a two-station metering control circuit common to said two-station subscriber lines for selecting and controlling the operation of a calling station's individual meter, said two-station metering control circuit being normally operative in response to the receipt of reverse battery for preparing for the operation of the selected calling station's meter on local calls between local subscriber lines, a first station identifying tone source in said two-station metering control circuit for indicating that the first station on any two-station line is calling, a toll trunk terminating in an operator's position, means for establishing a connection from any one of said local subscriber lines to said toll trunk to extend an incoming toll call to said operator's position; tone connecting means, coin refunding current connecting means, battery reversing connecting means, and booster battery connecting means in said toll trunk; means in said toll trunk for operating each of said specified connecting means in response to the operator at said position answering said incoming toll call to said toll trunk; means effective in case the calling line originating said incoming toll call to said toll trunk is a paystation subscriber line for audibly connecting said paystation tone source to the operator by the operation of said toll trunk tone connecting means, for refunding coins deposited in the paystation of the calling line by the operation of said toll trunk coin refunding current connecting means, for completing a talking circuit between the calling paystation line and the operator and for momentarily conditioning said paystation repeater for operation by the operation of said toll trunk battery reversing connecting means, and for disabling said momentarily conditioned paystation repeater by the operation of said toll trunk booster battery connecting means to prevent said repeater to collect deposited coins during said incoming toll call; means effective in case the calling line originating said incoming toll call to said toll trunk is a metered single party subscriber line for momentarily conditioning said metering control circuit for operation by the operation of said toll trunk battery reversing connecting means, for disabling said momentarily conditioned metering control circuit by the operation of said toll trunk booster battery connecting means to prevent said metering control circuit from operating the calling single party subscriber meter, and for audibly connecting said restricted service tone source to the operator in case the call is originated by a restricted subscriber line by the operation of said toll trunk connecting means, during said incoming toll call; and means effective in case the calling line originating said incoming toll call to said toll trunk is a metered calling two-station subscriber line for momentarily conditioning said two-station metering control circuit for operation by the operation of said toll trunk battery reversing connecting means, for disabling said momentarily conditioned two-station metering control circuit to prevent the operation of the calling station's individual meter during said incoming toll call and for connecting said first station identifying tone source to said toll trunk in case the first station on said calling line originated said toll call to said trunk by the operation of said toll trunk booster battery connecting means, and for audibly connecting said first station identifying tone source to the operator by the operation of said toll trunk tone connecting means.

9. In a telephone system, a group of local paystation subscriber lines each having an individual paystation, a paystation repeater common to said group of paystation subscriber lines for controlling collection of deposited coins in a calling paystation, said paystation repeater being normally operative in response to the receipt of reversal of battery for preparing for the collection of coins deposited in the calling paystation on local calls between local subscriber lines, a group of local metered single party subscriber lines, an individual meter for each single party subscriber line, a metering control circuit common to said group of local metered single party subscriber lines for controlling the operation of a calling single party's individual meter, said metering control circuit being normally operative in response to the receipt of reverse battery for preparing for the operation of the calling single party's individual meter on local calls between local subscriber lines, a group of local metered two-station subscriber lines, an individual meter for each station on each two-station subscriber line, a two-station metering control circuit common to said two-station subscriber lines for selecting and controlling the operation of a calling station's individual meter, said two-station metering control circuit being normally operative in response to the receipt of reverse battery for preparing for the operation of the selected calling station's meter on local calls between local subscriber lines, a toll trunk terminating in an operator's position, means for establishing a connection from any one of said local subscriber lines to said toll trunk to extend an incoming toll call to said operator's position; coin refunding current connecting means, battery reversing connecting means, and booster battery connecting means in said toll trunk; means in said toll trunk for operating each of said specified connecting means in response to the operator at said position answering said incoming toll call to said toll trunk; means effective in case the calling line originating said incoming toll call to said toll trunk is a paystation subscriber line for refunding coins deposited in the paystation of the calling line by the operation of said toll trunk coin refunding current connecting means, for completing a talking circuit between the calling paystation line and the operator and for momentarily conditioning said paystation repeater for operation by the operation of said toll trunk battery reversing connecting means, and for disabling said momentarily conditioned paystation repeater by the operation of said toll trunk booster battery connecting means to prevent said repeater from collecting deposited coins during said incoming toll call; means effective in case the calling line originating said incoming toll call to said toll trunk is a metered single party subscriber line for momentarily conditioning said metering control circuit for operation by the operation of said toll trunk battery reversing connecting means, and for disabling said momentarily conditioned metering control circuit by the operation of said toll trunk booster battery connecting means to prevent said metering control circuit from operating the calling single party subscriber meter during said incoming toll call; and means effective in case the calling line originating said incoming toll call to said toll trunk is one of the stations on a metered calling two-station subscriber line for momentarily conditioning said two-station metering control circuit for operation by the operation of said toll trunk battery reversing connecting means, for disabling said momentarily conditioned two-station metering control circuit to prevent the operation of the calling station's individual meter during said incoming toll call by the operation of said toll trunk booster battery connecting means.

10. In a measured service telephone system, calling subscriber lines having charging means for charging the subscriber for completed connections, a charge control circuit common to said lines, means for connecting any calling one of said lines to said charge control circuit in response to said one calling line originating an outgoing call, an answering potential and means for connecting said answering potential to said charge control circuit in response to any said outgoing call being answered, timing means in said charge control circuit operative in response to the receipt of said answering potential for subsequently operating the charging means of said calling line on predetermined ones of outgoing calls, a disabling potential, means for connecting said disabling potential to said charge control circuit only on certain outgoing calls in response to said certain outgoing calls being answered, and disabling means in said charge control circuit operated in response to the receipt of said disabling potential for disabling said timing means to thereby prevent the subsequent operation of the charging means of said calling line.

11. In a telephone system, classes of calling subscriber lines arranged in different class groups, a tone source for each different class group, a toll trunk terminating in an operator's position, means controlled from any calling one of said subscriber lines for completing a connection from said calling line to said trunk and for connecting the class of tone source corresponding to the class of the calling line to said trunk, answering means in said trunk operated in response to the operator at said position answering the call received by said trunk, tone connecting means in said trunk operated by said answering means to momentarily connect the tone source corresponding to the class of the calling subscriber to the operator, call charging means individual to each calling subscriber line, a common charge control means for each different class group of calling subscriber lines and included in said completed connection dependent upon the class of said calling line, operating means in each common charge control means for operating the individual charging means of the connected calling subscriber line, starting means in each common charge control means for initiating the operation of its respective operating means, battery reversing means in said trunk operated by said answering means to reverse battery back towards said calling line, means in said connected common charge control means operated by said reversal of battery for conditioning its respective starting means for operation, a source of booster battery in said trunk, means in said trunk operated by said answering means for extending booster battery back towards said calling line, and disabling means in each common charge control means, said disabling means in said connected common charge control means operated by said booster battery for disabling its respective conditioned starting means to prevent the operation of its respective operating means to thereby prevent the operation of the calling subscriber's individual charging means on calls extended to said trunk.

12. In a telephone system as claimed in claim 11, a talking circuit particular to one of said groups of subscriber lines included in said completed connection and dependent upon a call being initiated from any one of said lines in said group of lines, and means operated responsive to said reversal of battery back to said calling line for completing said talking circuit.

13. In a telephone system as claimed in claim 11, a talking circuit particular to another of said groups of subscriber lines and dependent upon a call being initiated from any one of said lines in said other group of lines, and means operated responsive to operation of said disabling means associated with said other group of subscriber lines for completing the talking circuit on calls extended to said trunk.

14. In a telephone system, a calling line and a meter connected thereto, a called line, connecting means operable for establishing a local connection from said calling line to said called line, a timing means in said connecting means for controlling the periodic operation of said meter on completed local connections, additional timing means in said connecting means for causing a warning tone to be transmitted to the calling party a predetermined time before each operation of said meter, a toll trunk terminating in an operator's position, said connecting means also operable for connecting said calling line to said toll trunk for establishing a toll call, and disabling means included in said connecting means operable only on said toll call responsive to the answering of said toll operator for disabling said timing and said additional timing means.

15. In a telephone system, a plurality of substation lines, each of said substation lines having a substation thereon, a plurality of paystation lines, each of said paystation lines having a paystation thereon, connecting means including a repeater circuit operable responsive to the depositing of a coin at any one of said paystations for connecting that calling paystation to any other one of said lines for establishing a local call, a first timing means in said repeater circuit operated during said paystation local call for transmitting a warning tone to the calling paystation after a predetermined period thereby informing the party thereat that another coin must be deposited for continued conversation, blocking means in said repeater circuit for blocking the talking circuit, collect potential in said repeater circuit for collecting deposited coins, a second timing means in said repeater circuit also operated during a paystation local call for operating said blocking means to block the talking circuit and for automatically connecting said collect potential to the calling paystation a predetermined period after the transmission of the warning tone, thereby collecting the previously deposited coin, means for causing reestablishment of the talking circuit responsive to the depositing of an additional coin at the calling paystation, a toll trunk, said connecting means including said first and second timing means also operable for connecting any one of said paystation lines to said toll trunk for toll service, an operator's position associated with said toll trunk and disabling means in said repeater circuit operated on such a toll service call responsive to answering by the toll operator for disabling said first and said second timing means to prevent blocking of the talking circuit and to prevent the automatic collection of deposited coins.

16. In a telephone system, a group of local metered two-station subscriber lines, an individual meter for each first station and an individual meter for each second station for each two-station subscriber line, a two-station metering control circuit common to said two-station subscriber lines for selecting and controlling the operation of a calling station's individual meter, said two-station metering control circuit being normally operative in response to the receipt of reverse battery for preparing for the operation of the selected calling station's meter on completed local calls between local subscriber lines, a first station identifying tone source in said two-station metering control circuit for indicating that the first station on any two-station line is calling, a toll trunk terminating in an operator's position, means for establishing a connection from any one of said local subscriber lines to said toll trunk to extend an incoming toll call to said operator's position; tone connecting means, battery reversing connecting means, and booster battery connecting means in said toll trunk; means in said toll trunk for operating each of said specified connecting means in response to the operator at said position answering said incoming toll call to said toll trunk; and means effective in case the calling line originating said incoming toll call to said toll trunk is a metered calling two-station subscriber line for momentarily conditioning said two-station metering control circuit for operation by the operation of said toll trunk battery reversing connecting means, for disabling said momentarily conditioned two-station metering control circuit to prevent the operation of the calling station's individual meter during said incoming toll call and for connecting said first station identifying tone source to said toll trunk in case said first station on said calling line originated said call to said trunk by the operation of said toll trunk booster battery connecting means, and for audibly connecting said first station identifying tone source to the operator by the operation of said toll trunk tone connecting means.

17. In a telephone system, a toll trunk terminating in an operator's position, called lines, paystation subscriber lines, metered subscriber lines each including a meter individual to each subscriber line, connecting means for extending a local call from any calling one of said subscriber lines to a called line or for extending a toll call from any calling one of said subscriber lines to said trunk, means for reversing battery back to said connecting means in either a local call or on a toll call in response to said call being answered by either said called line or by the operator at said position, a paystation trunk having a timer including a timer operating circuit conditioned for operation in response to said reversal of battery and subsequently completed to operate said timer to periodically require the deposit of coins in case said call is a completed local call and including disabling means in said call for disabling said timer operating circuit to prevent operation of said timer in case said call is a toll call to said toll trunk, and a metering trunk having a metering circuit conditioned for operation in response to said reversal of battery and subsequently completed to operate the calling subscriber's meter in case said call is a completed local call and including disabling means operated in response to the operator at said position answering said call for disabling said metering circuit to prevent operation of said calling subscriber's meter in case said call is a toll call to said toll trunk.

18. In a telephone system as claimed in claim 17, a talking circuit in said paystation trunk completed in response to said battery reversal on either local or toll calls.

19. In a telephone system as claimed in claim 17, a talking circuit in said metering trunk completed at the same time said metering circuit is completed in case of a local call or in response to the operation of said disabling means in case of a toll call.

20. In a telephone system as claimed in claim 17, refunding means associated with each of said paystation subscriber lines and means in said toll trunk operated responsive to said operator answering a call from a paystation line over said trunk for causing said refunding means associated with said calling paystation line to operate.

21. In a measured service telephone system, local subscriber lines having charging means, a charge control circuit common to said lines including timer means automatically operated periodically at predetermined timed intervals for periodically operating the calling subscriber's charging means after originating and completing a local outgoing call to any local subscriber line, a toll trunk terminating in a toll operator's position, means including said charge control circuit for establishing a connection to said toll trunk in response to any one of said lines originating an outgoing toll call to said position, disabling means in said charge control circuit for disabling said timer means, and means responsive to the operator answering said outgoing toll call to said toll trunk for operating said disabling means in said charge control circuit to prevent the operation of said timer means and the automatic periodic operations of the calling subscribers charging means during said toll call.

References Cited in the file of this patent

UNITED STATES PATENTS

| | | |
|---|---|---|
| 1,480,403 | Lattig | Jan. 8, 1924 |
| 1,917,884 | Hague | July 11, 1933 |
| 1,919,317 | Burgener | July 25, 1933 |
| 2,137,409 | Martin | Nov. 22, 1938 |
| 2,214,213 | Voss | Sept. 10, 1940 |
| 2,226,731 | Lomax | Dec. 31, 1940 |
| 2,367,769 | Goddard | Jan. 23, 1945 |
| 2,410,520 | Ostline | Nov. 5, 1946 |
| 2,535,765 | Voss | Dec. 26, 1950 |